(12) United States Patent
Huberman et al.

(10) Patent No.: US 11,657,604 B2
(45) Date of Patent: May 23, 2023

(54) SYSTEMS AND METHODS FOR ESTIMATING FUTURE PATHS

(71) Applicant: Mobileye Vision Technologies Ltd., Jerusalem (IL)

(72) Inventors: David Huberman, Jerusalem (IL); Shaked Shammah, Jerusalem (IL); Ofer Springer, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 189 days.

(21) Appl. No.: 17/314,157

(22) Filed: May 7, 2021

(65) Prior Publication Data

US 2021/0365750 A1    Nov. 25, 2021

Related U.S. Application Data

(63) Continuation of application No. 15/398,926, filed on Jan. 5, 2017, now Pat. No. 11,023,788.
(Continued)

(51) Int. Cl.
*G06V 30/194*    (2022.01)
*G06V 20/56*    (2022.01)
(Continued)

(52) U.S. Cl.
CPC ......... *G06V 30/194* (2022.01); *G05D 1/0088* (2013.01); *G05D 1/0219* (2013.01);
(Continued)

(58) Field of Classification Search
CPC .... G06V 30/194; G06V 20/588; G06V 20/56; G05D 1/0088; G05D 1/0219; G05D 1/0238; G06K 9/6281
See application file for complete search history.

(56) References Cited

U.S. PATENT DOCUMENTS 4,967,362 A    10/1990    Schutten
6,720,560 B1    4/2004    Edgar
(Continued)

FOREIGN PATENT DOCUMENTS

CN    101837781 A    9/2010
CN    101929867 A    12/2010
JP    10-069598 A    3/1998

OTHER PUBLICATIONS

Japanese Office Action dated Dec. 24, 2020, in counterpart Japanese Application No. 2018-530622.
(Continued)

*Primary Examiner* — Mia M Thomas
(74) *Attorney, Agent, or Firm* — Finnegan, Henderson, Farabow, Garrett & Dunner, LLP

(57) ABSTRACT

A system and method estimate a future path ahead of a current location of a vehicle. The system includes at least one processor programmed to: obtain an image of an environment ahead of a current arbitrary location of a vehicle navigating a road; obtain a trained system that was trained to estimate a future path on a first plurality of images of environments ahead of vehicles navigating roads; apply the trained system to the image of the environment ahead of the current arbitrary location of the vehicle; and provide, based on the application of the trained system to the image, an estimated future path of the vehicle ahead of the current arbitrary location.

24 Claims, 22 Drawing Sheets

Related U.S. Application Data

(60) Provisional application No. 62/373,153, filed on Aug. 10, 2016, provisional application No. 62/275,046, filed on Jan. 5, 2016.

(51) Int. Cl.
  *G05D 1/00* (2006.01)
  *G05D 1/02* (2020.01)
  *G06K 9/62* (2022.01)

(52) U.S. Cl.
  CPC ......... *G05D 1/0238* (2013.01); *G06K 9/6281* (2013.01); *G06V 20/56* (2022.01); *G06V 20/588* (2022.01)

(56) References Cited

U.S. PATENT DOCUMENTS

| | | | |
|---|---|---|---|
| 8,958,911 | B2 | 2/2015 | Wong |
| 9,269,136 | B2 | 2/2016 | Day |
| 9,313,383 | B2 | 4/2016 | Miller |
| 9,940,729 | B1 | 4/2018 | Kwant |
| 9,984,455 | B1 | 5/2018 | Fox |
| 10,071,676 | B2 | 9/2018 | Schofield |
| 10,186,156 | B2 | 1/2019 | Sweeney |
| 10,215,583 | B2 | 2/2019 | Ng-Thaw-Hing |
| 10,424,079 | B2 | 9/2019 | Viswanathan |
| 10,442,438 | B2 * | 10/2019 | Fritz .................. G06V 10/60 |
| 10,614,717 | B2 | 4/2020 | Caldwell |
| 10,696,227 | B2 | 6/2020 | Stein |
| 11,181,926 | B2 * | 11/2021 | Shalev-Shwartz .......................... G01C 21/3492 |
| 2002/0072850 | A1 | 6/2002 | McClure |
| 2004/0120591 | A1 | 6/2004 | Brower |
| 2004/0141067 | A1 | 7/2004 | Nakayama |
| 2006/0050785 | A1 | 3/2006 | Watanabe |
| 2006/0200289 | A1 | 9/2006 | Chino |
| 2007/0017735 | A1 | 1/2007 | Kataoka |
| 2007/0139176 | A1 | 6/2007 | Victor |
| 2008/0125972 | A1 | 5/2008 | Neff |
| 2009/0087029 | A1 | 4/2009 | Coleman |
| 2010/0098295 | A1 | 4/2010 | Zhang |
| 2010/0228420 | A1 | 9/2010 | Lee |
| 2010/0305857 | A1 | 12/2010 | Byrne |
| 2012/0083947 | A1 | 4/2012 | Anderson |
| 2012/0215394 | A1 | 8/2012 | Wang |
| 2014/0063055 | A1 | 3/2014 | Osterhout |
| 2015/0104757 | A1 | 4/2015 | Moncrief |
| 2015/0120094 | A1 | 4/2015 | Kimchi |
| 2015/0156747 | A1 | 6/2015 | Skaaksrud |
| 2015/0158524 | A1 | 6/2015 | Lee |
| 2015/0166059 | A1 | 6/2015 | Ko |
| 2015/0185025 | A1 | 7/2015 | Lacaze |
| 2015/0187224 | A1 | 7/2015 | Moncrief |
| 2015/0204687 | A1 * | 7/2015 | Yoon ................. G06T 19/006 701/436 |
| 2015/0254738 | A1 | 9/2015 | Wright |
| 2015/0294161 | A1 | 10/2015 | Schamp |
| 2015/0371095 | A1 * | 12/2015 | Hartmann ............... G06T 3/40 348/148 |
| 2016/0121924 | A1 | 5/2016 | Norstad |
| 2016/0231747 | A1 | 8/2016 | Neff |
| 2016/0288790 | A1 | 10/2016 | Aoki |
| 2016/0288831 | A1 | 10/2016 | Lee |
| 2016/0325753 | A1 | 11/2016 | Stein |
| 2016/0328619 | A1 * | 11/2016 | Yi ......................... G06V 20/58 |
| 2016/0379064 | A1 | 12/2016 | van Beek |
| 2017/0039765 | A1 | 2/2017 | Zhou |
| 2017/0076616 | A1 | 3/2017 | Kanade |
| 2017/0160744 | A1 | 6/2017 | Chia |
| 2017/0166207 | A1 | 6/2017 | Darms |
| 2017/0174261 | A1 | 6/2017 | Micks |
| 2017/0225686 | A1 | 8/2017 | Takaso |
| 2017/0313439 | A1 | 11/2017 | Holt |
| 2017/0336790 | A1 | 11/2017 | Glebov |
| 2018/0024562 | A1 | 1/2018 | Bellaiche |
| 2018/0046187 | A1 | 2/2018 | Martirosyan |
| 2018/0050800 | A1 | 2/2018 | Boykin |
| 2018/0061243 | A1 | 3/2018 | Shloosh |
| 2018/0150718 | A1 | 5/2018 | Omari |
| 2018/0233048 | A1 | 8/2018 | Andersson |
| 2018/0259966 | A1 | 9/2018 | Long |
| 2018/0281814 | A1 | 10/2018 | Murray |
| 2018/0297587 | A1 | 10/2018 | Kasaiezadeh Mahabadi |
| 2019/0049972 | A1 | 2/2019 | Prasad |
| 2019/0138024 | A1 * | 5/2019 | Liang .................. G06V 20/588 |
| 2019/0295420 | A1 * | 9/2019 | Fu ........................ G06V 20/588 |
| 2020/0074266 | A1 * | 3/2020 | Peake .................... G06T 7/246 |
| 2021/0132619 | A1 * | 5/2021 | Refaat .................... G06N 3/08 |
| 2021/0201676 | A1 * | 7/2021 | Tariq ..................... G08G 1/017 |
| 2021/0326699 | A1 * | 10/2021 | Davies ................ G06Q 10/047 |
| 2022/0101155 | A1 * | 3/2022 | Beaudoin ................ G06N 3/08 |
| 2022/0355824 | A1 * | 11/2022 | Goyal .................. G05D 1/0217 |

OTHER PUBLICATIONS

International Search Report and Written Opinion issued by the European Patent Office dated May 17, 2017, in counterpart International Application No. PCT/IB2017/000038 (16 pages).

Jaradat Mohammed Abdel Kareem et al., "Enhanced, Delay Dependent, Intelligent Fusion for INS/GPS Navigation System", IEEE Sensor Journal, IEEE Service Center, New York, NU, US, vol. 14, No. 5 May 1, 2014.

Nikolaos D. Doulamis, "Coupled multi-object tracking and labeling for vehicle trajectory estimation and matching", Multimedia Tools and Applications, Kluwer Academic Publishers, BO, Vo. 50, No. 1, Sep. 29, 2009.

Chinese Office Action issued by the State Intellectual Property Office (SIPO) of the People's Republic of China dated May 28, 2021, in Chinese Application No. 201780005722.8.

Japanese Office Action issued by the Japanese Patent Office dated Oct. 29, 2021, for Japanese Application No. 2018-530622.

Chinese Office Action issued by the State Intellectual Property Office (SIPO) of the People's Republic of China dated Jan. 30, 2022, in counterpart Chinese Application No. 201780005722.8.

Chinese Office Action issued by the State Intellectual Property Office (SIPO) of the People's Republic of China dated May 23, 2022, in counterpart Chinese Application No. 201780005722.8.

Jim Allen, "Four-Wheeler's Bible", Shanghai Scientific & Technical Publishers, Jul. 31, 2015.

Yanqin Zhang et al., "Intelligent Vehicle Transportation System," Beijing University of Technology Press, Apr. 30, 2011.

Dingyue Chen et al., "Modern Automobile Control and Its Intelligence," Xi'an Jiaotong University Press, Apr. 30, 2011.

Chinese Office Action issued by the State Intellectual Property Office (SIPO) of the People's Republic of China dated Oct. 26, 2022, in counterpart Chinese Application No. 201780005722.8.

\* cited by examiner

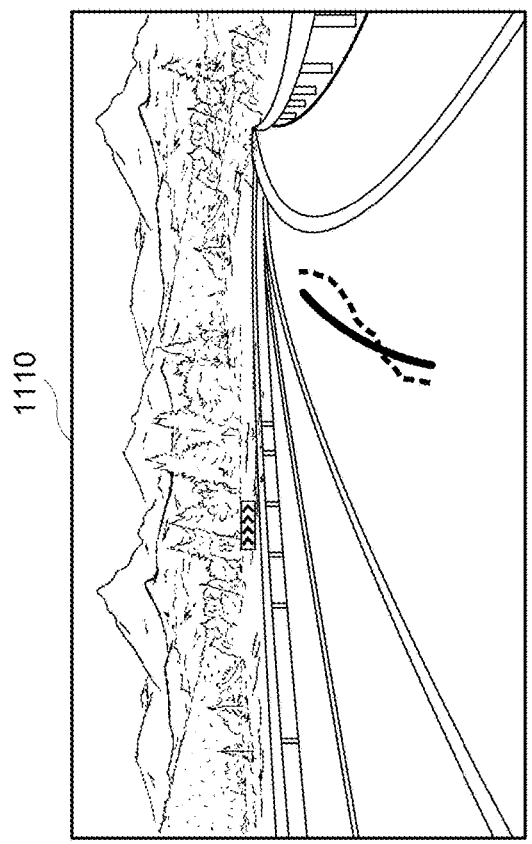
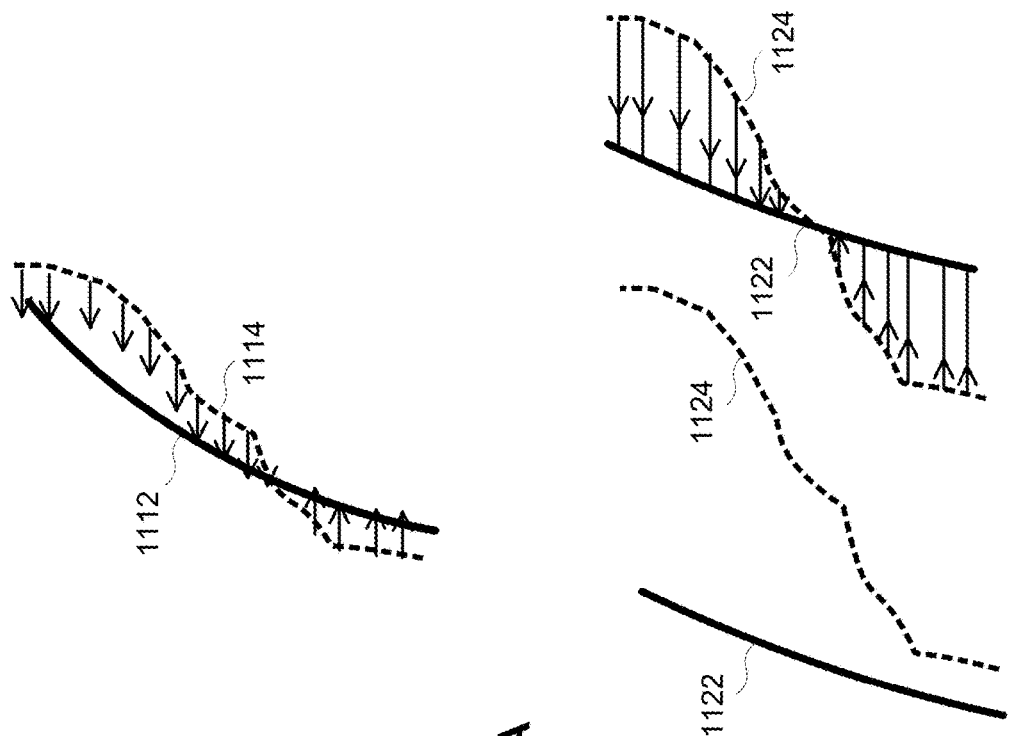
FIG. 11A
FIG. 11B

SYSTEMS AND METHODS FOR ESTIMATING FUTURE PATHS

CROSS REFERENCES TO RELATED APPLICATIONS

This application is a continuation application of U.S. application Ser. No. 15/398,926, filed Jan. 5, 2017, which claims the benefit of priority of U.S. Provisional Application No. 62/275,046, filed on Jan. 5, 2016; and U.S. Provisional Application No. 62/373,153, filed on Aug. 10, 2016. All of the foregoing applications are incorporated herein by reference in their entirety.

BACKGROUND

Technical Field

The present disclosure relates generally to advanced driver assistance systems (ADAS), and autonomous vehicle (AV) systems. Additionally, this disclosure relates to systems and methods for processing images, and systems and methods for estimating a future path of a vehicle.

Background Information

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc. The ability of preconfigured classifiers, as a single solution, to deal with the infinitesimal variety and detail of road environments and its surroundings and its often dynamic nature (moving vehicles, shadows, etc.), is however limited. As ADAS and AV systems progress towards fully autonomous operation, it would be beneficial to augment the abilities of such systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as FCW, LDW and TSR, as opposed to fully autonomous driving. In various embodiments, the system may include one, two or more cameras mountable in a vehicle and an associated processor that monitor the environment of the vehicle. In further embodiments, additional types of sensors can be mounted in the vehicle ad can be used in the autonomous navigation and/or driver assist system. In some examples of the presently disclosed subject matter, the system may provide techniques for processing images of an environment ahead of a vehicle navigating a road for training a system (e.g., a neural network, a deep learning system applying, for example, deep learning algorithms, etc.) to estimate a future path of a vehicle based on images. In yet further examples of the presently disclosed subject matter, the system may provide techniques for processing images of an environment ahead of a vehicle navigating a road using a trained system to estimate a future path of the vehicle.

According to examples of the presently disclosed subject matter, there is provided a system for estimating a future path ahead of a current location of a vehicle. The system may include at least one processor programmed to: obtain an image of an environment ahead of a current arbitrary location of a vehicle navigating a road; obtain a trained system that was trained to estimate a future path on a first plurality of images of environments ahead of vehicles navigating roads; apply the trained system to the image of the environment ahead of the current arbitrary location of the vehicle; and provide, based on the application of the trained system to the image, an estimated future path of the vehicle ahead of the current arbitrary location.

In some embodiments, the trained system comprises piece-wise affine functions of global functions. In some embodiments, the global functions can include: convolutions, max pooling and/or a rectifier liner unit (ReLU).

In some embodiments, the method can further include: utilizing the estimated future path ahead of the current location of the vehicle to control at least one electronic or mechanical unit of the vehicle to change at least one motion parameter of the vehicle. In some embodiments, the method can further include: utilizing the estimated future path ahead of the current location of the vehicle to provide a sensory feedback to a driver of the vehicle.

In some embodiments, the estimated future path of the vehicle ahead of the current location can be further based on identifying one or more predefined objects appearing in the image of the environment using at least one classifier.

The method can further include: utilizing the estimated future path ahead of the current location of the vehicle to provide a control point for a steering control function of the vehicle.

In some embodiments, applying the trained system to the image of the environment ahead of the current location of the vehicle provides two or more estimated future paths of the vehicle ahead of the current location.

In some embodiments, the at least one processor can be further programmed to: utilizing the estimated future path ahead of the current location of the vehicle in estimating a road profile ahead of the current location of the vehicle.

In some embodiments, applying the trained system to the image of the environment ahead of the current location of the vehicle provides two or more estimated future paths of the vehicle ahead of the current location, and can further include estimating a road profile along each one of the two or more estimated future paths of the vehicle ahead of the current location.

In some embodiments, the at least one processor can be further programmed to: utilizing the estimated future path ahead of the current location of the vehicle in detecting one or more vehicles that are located in or near the future path of the vehicle.

In some embodiments, the at least one processor can be further programmed to: causing at least one electronic or mechanical unit of the vehicle to change at least one motion parameter of the vehicle based on a location of one or more vehicles which were determined to be in or near the future path of the vehicle.

In some embodiments, the at least one processor can be further programmed to: triggering a sensory alert to indicate to a user of that one or more vehicles are determined to be in or near the future path of the vehicle.

The method of processing images can include, obtaining a first plurality of training images, each one of the first plurality of training images is an image of an environment ahead of a vehicle navigating a road; for each one of the first plurality of training images, obtaining a prestored path of the vehicle ahead of a respective present location of the vehicle; training a system to provide, given an image, a future path for a vehicle navigating a road ahead of a respective present location of the vehicle, wherein training the system includes: providing the first plurality of training images as input to the system; at each iteration of the training, computing a loss function based on a respective provisional future path that was estimated by a current state of weights and a respective prestored path; and updating the weights of the neural according to results of the loss function.

In some embodiments, obtaining the first plurality of training images can further include obtaining for each one of the images from first plurality of training images data indicating a location of the vehicle on the road at an instant when the image was captured. In some embodiments, obtaining the first plurality of training images, includes obtaining a location of at least one lane mark in at least one image from the first plurality of training images, and wherein obtaining for each one of the images from the first plurality of training images data indicating the location of the vehicle on the road at the instant when the image was captured, comprises, for the at least one image from the first plurality of training images, determining the location of the vehicle on the road at an instant when the at least one image was captured according to a location of the at least one lane mark in the at least one image.

In some embodiments, determining the location of the vehicle on the road at an instant when the at least one image from the first plurality of training images was captured according to a location of the at least one lane mark in the at least one image, can include determining the location of the vehicle on the road at a predefined offset from the location of the at least one lane mark.

In some embodiments, the prestored path of the vehicle ahead of the respective present location of the vehicle can be determined based on locations of the vehicle on the road at respective instants when a respective second plurality of training images were captured, and wherein the second plurality of training images can be images from the first plurality of training images that were captured subsequent to the image associated with the present location.

In some embodiments, training the system includes a plurality of iterations and can be carried out until a stop condition is met.

In some embodiments, the method can further include providing as output a trained system that is configured to provide, given an arbitrary input image of an environment ahead of a vehicle navigating a road, a future path estimation for the vehicle.

In some embodiments, the first plurality of training images can include a relatively higher number of images of environments which appear relatively rarely on roads. In some embodiments, the first plurality of training images can include a relatively higher number of images of environments that comprise a curved road. In some embodiments, the first plurality of training images can include a relatively higher number of images of environments that comprise a lane split, a lane merge, a highway exit, a highway entrance and/or a junction. In some embodiments, the first plurality of training images can include a relatively higher number of images of environments that include a poor or no lane markings, Botts dots and/or shadows on a road ahead of the vehicle.

In some embodiments, the stop condition can be a predefined number of iterations.

In some embodiments, the method can further include providing as output a trained system with a configuration of the trained system that was reached at a last iteration of the training the system.

According to a further aspect of the presently disclosed subject matter, there is provided a method of estimating a future path ahead of a current location of a vehicle. According to examples of the presently disclosed subject matter, the method of estimating a future path ahead of a current location of a vehicle can include: obtaining an image of an environment ahead of a current arbitrary location of a vehicle navigating a road; obtaining a trained system that was trained to estimate a future path on a first plurality of images of environments ahead of vehicles navigating roads; and applying the trained system to the image of the environment ahead of the current arbitrary location of the vehicle, to thereby provide an estimated future path of the vehicle ahead of the current arbitrary location.

In some embodiments, the trained system comprises piece-wise affine functions of global functions. In some embodiments, the global functions can include: convolutions, max pooling and/or rectifier liner unit (ReLU).

In some embodiments, the method can further include: utilizing the estimated future path ahead of the current location of the vehicle to control at least one electronic or mechanical unit of the vehicle to change at least one motion parameter of the vehicle. In some embodiments, the method can further include: utilizing the estimated future path ahead of the current location of the vehicle to provide a sensory feedback to a driver of the vehicle.

In some embodiments, the estimated future path of the vehicle ahead of the current location can be further based on identifying one or more predefined objects appearing in the image of the environment using at least one classifier.

The method can further include: utilizing the estimated future path ahead of the current location of the vehicle to provide a control point for a steering control function of the vehicle.

In some embodiments, applying the future path estimation trained system to the image of the environment ahead of the current location of the vehicle provides two or more estimated future paths of the vehicle ahead of the current location.

In some embodiments, the method can further include: utilizing the estimated future path ahead of the current location of the vehicle in estimating a road profile ahead of the current location of the vehicle.

In some embodiments, applying the future path estimation trained system to the image of the environment ahead of the current location of the vehicle provides two or more estimated future paths of the vehicle ahead of the current location, and can further include estimating a road profile along each one of the two or more estimated future paths of the vehicle ahead of the current location.

In some embodiments, the method can further include: utilizing the estimated future path ahead of the current location of the vehicle in detecting one or more vehicles that are located in or near the future path of the vehicle.

In some embodiments, the method can further include causing at least one electronic or mechanical unit of the vehicle to change at least one motion parameter of the vehicle based on a location of one or more vehicles which were determined to be in or near the future path of the vehicle.

In some embodiments, the method can further include: triggering a sensory alert to indicate to a user of that one or more vehicles are determined to be in or near the future path of the vehicle.

BRIEF DESCRIPTION OF THE DRAWINGS

The accompanying drawings, which are incorporated in and constitute a part of this disclosure, illustrate various disclosed embodiments. In the drawings:

FIGS. 11A and 11B are graphical illustrations of certain aspects of training a system consistent with some disclosed embodiments.

DETAILED DESCRIPTION

Before discussing in detail examples of features of the processing images of an environment ahead of a vehicle navigating a road for training a system, such as a neural network or a deep learning system, to estimate a future path of a vehicle based on images or feature of the processing of images of an environment ahead of a vehicle navigating a road using a trained system to estimate a future path of the vehicle, there is provided a description of various possible implementations and configurations of a vehicle mountable system that can be used for carrying out and implementing the methods according to examples of the presently disclosed subject matter. In some embodiments, various examples of the vehicle mountable system can be mounted in a vehicle, and can be operated while the vehicle is in motion. In some embodiments, the vehicle mountable system can implement the methods according to examples of the presently disclosed subject matter.

Figure 1:
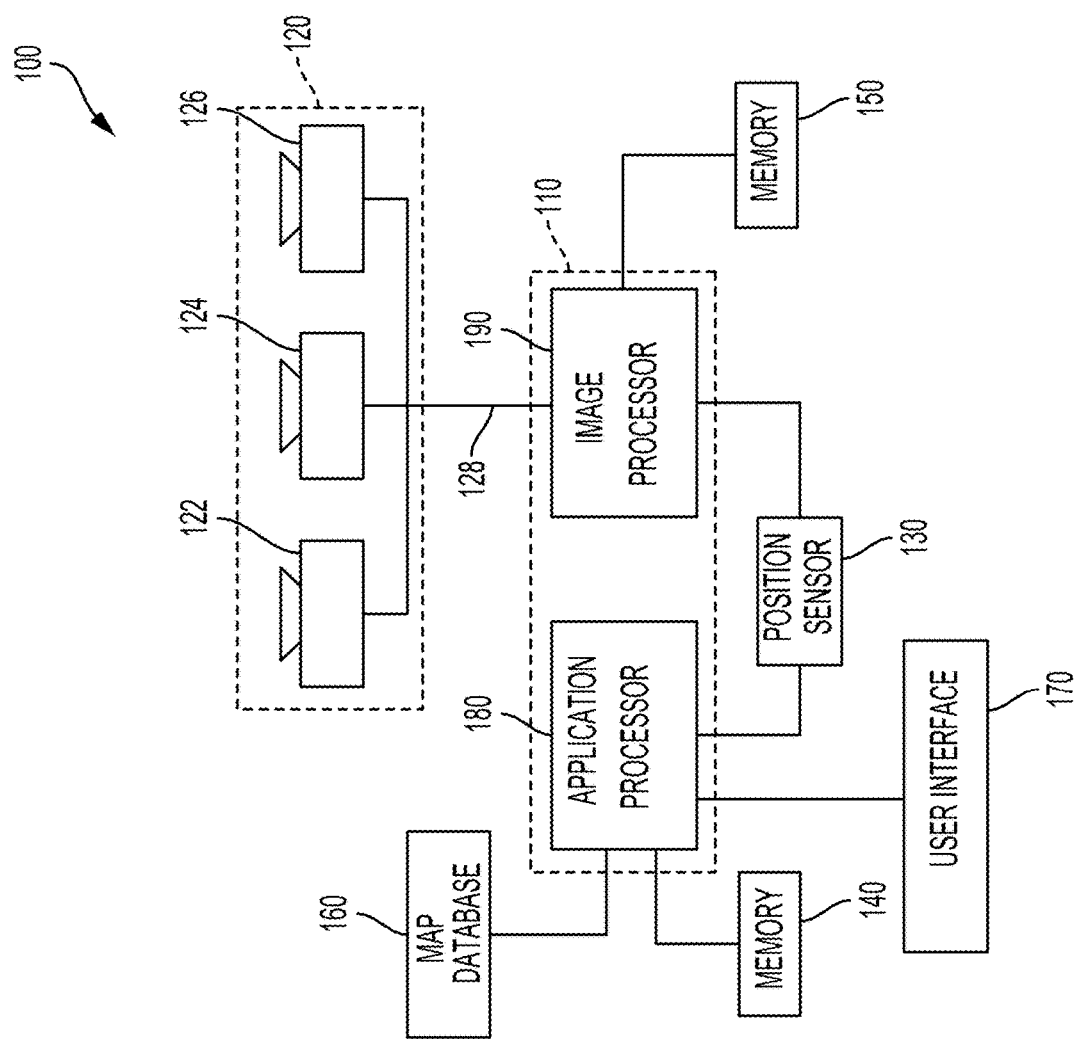
FIG. 1 is a block diagram representation of a system consistent with the disclosed embodiments.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition device 120. For example, data interface 128 can include any wired and/or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed examples. In yet another example, the EyeQ4®, the fourth generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing and processing the imagery from the image sensors. The CPU can include any number of microcontrollers or microprocessors. The support circuits can be any number of circuits generally well known in the art, including cache, power supply, clock and input-output circuits. The memory can store software that, when executed by the processor, controls the operation of the system. The memory can include databases and image processing software. The memory can include any number of random access memories, read only memories, flash memories, disk drives, optical storage, removable storage and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100. In some embodiments, user interface 170 can include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100. Information can be provided by the system 100, through the user interface 170, to the user in a similar manner.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensors, a RF sensor (e.g., radar transceiver), a LIDAR sensor. Such sensors can be used independently of or in cooperation with the image acquisition device 120. For example, the data from the radar system (not shown) can be used for validating the processed information that is received from processing images acquired by the image acquisition device 120, e.g., to filter certain false positives resulting from processing images acquired by the image acquisition device 120.

Figure 2A:
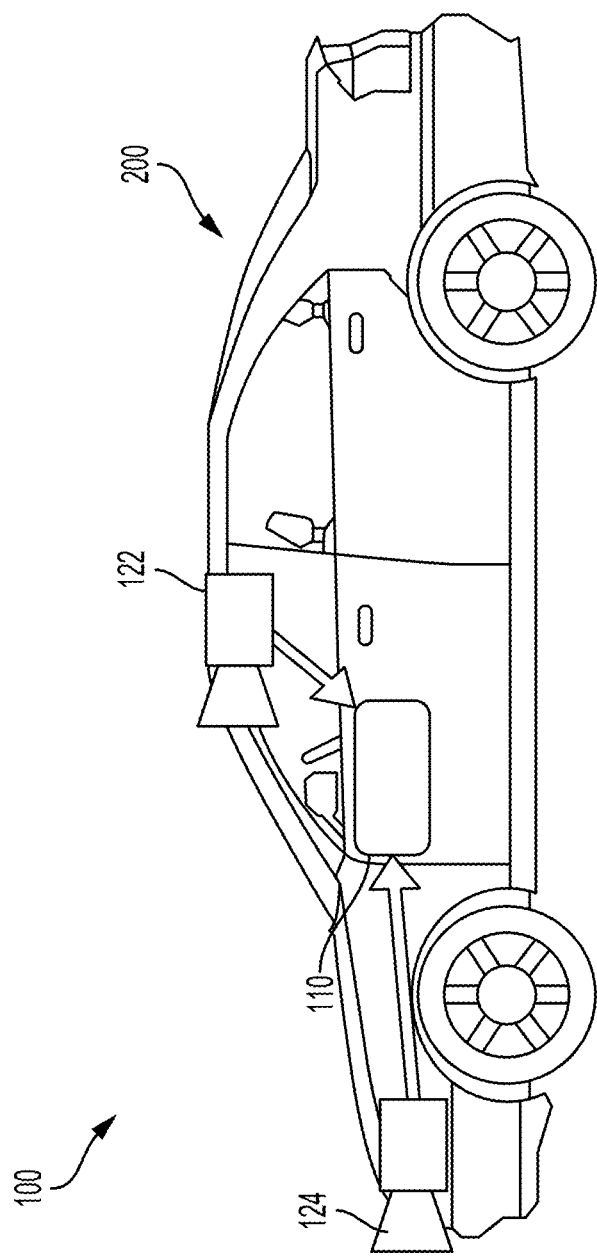
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3A-3C, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver, In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
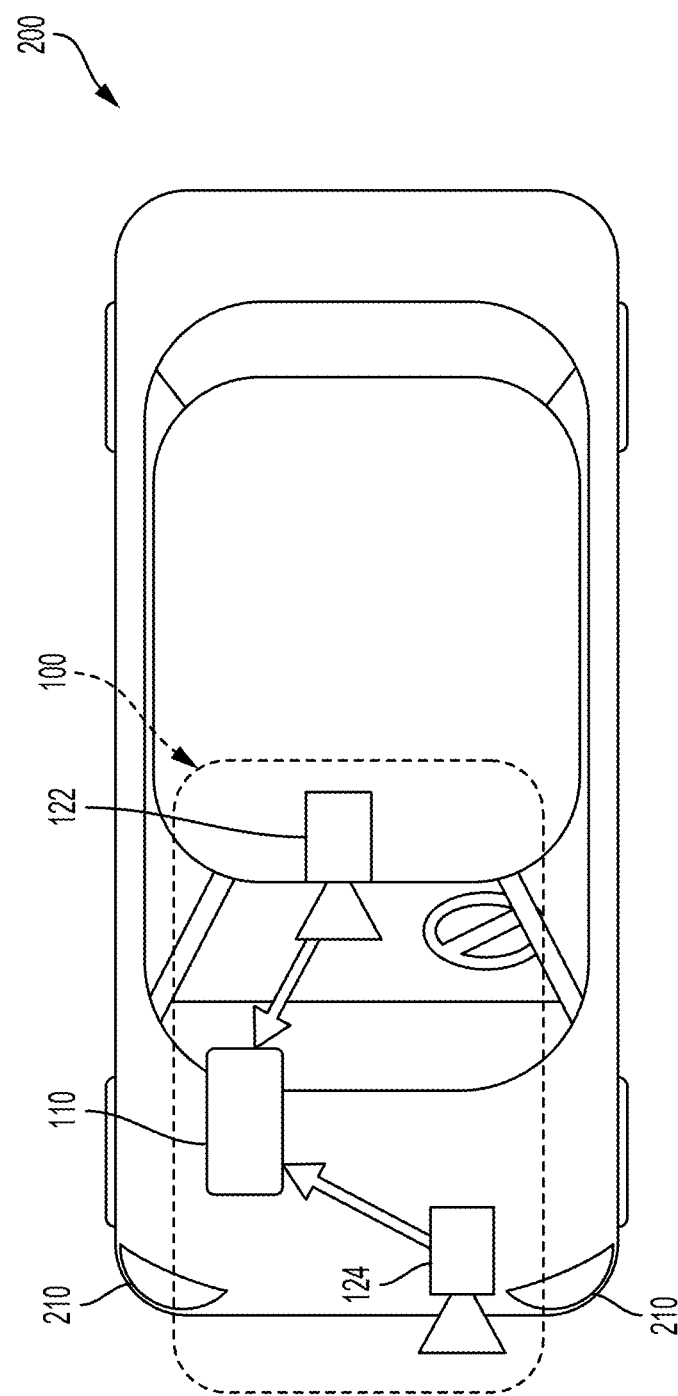
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
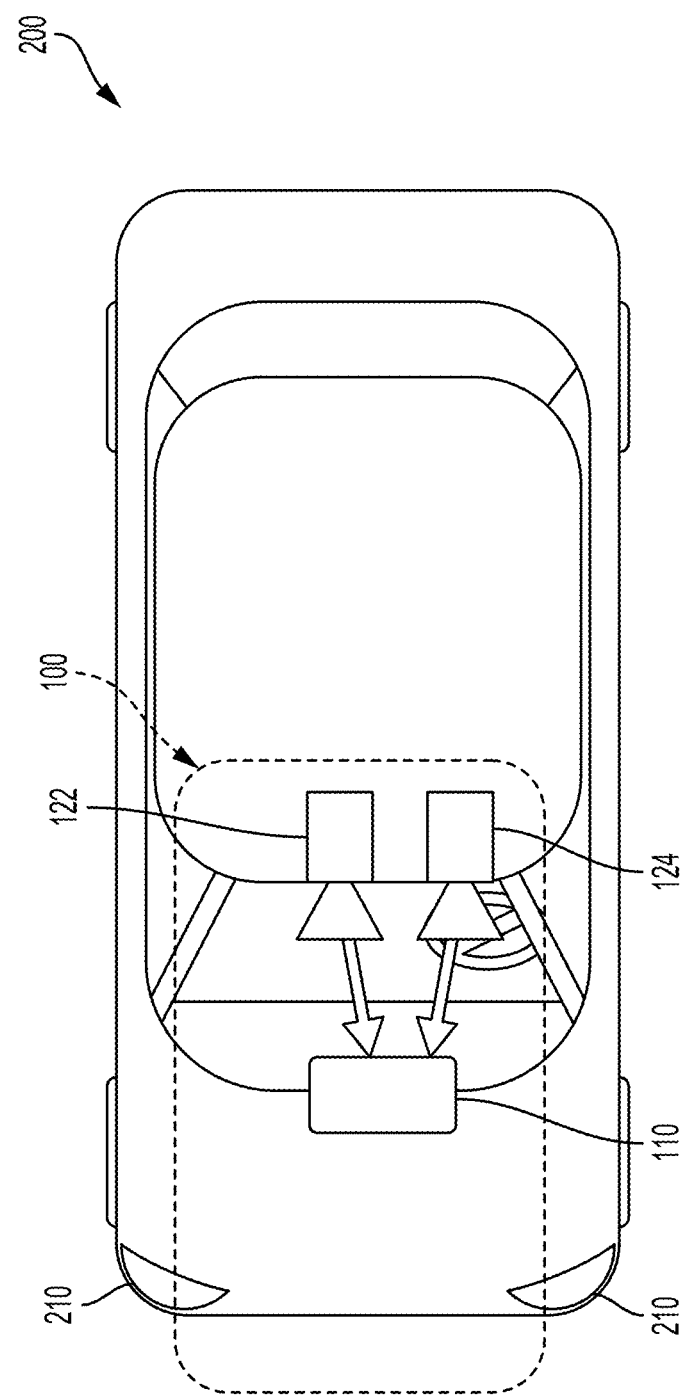
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
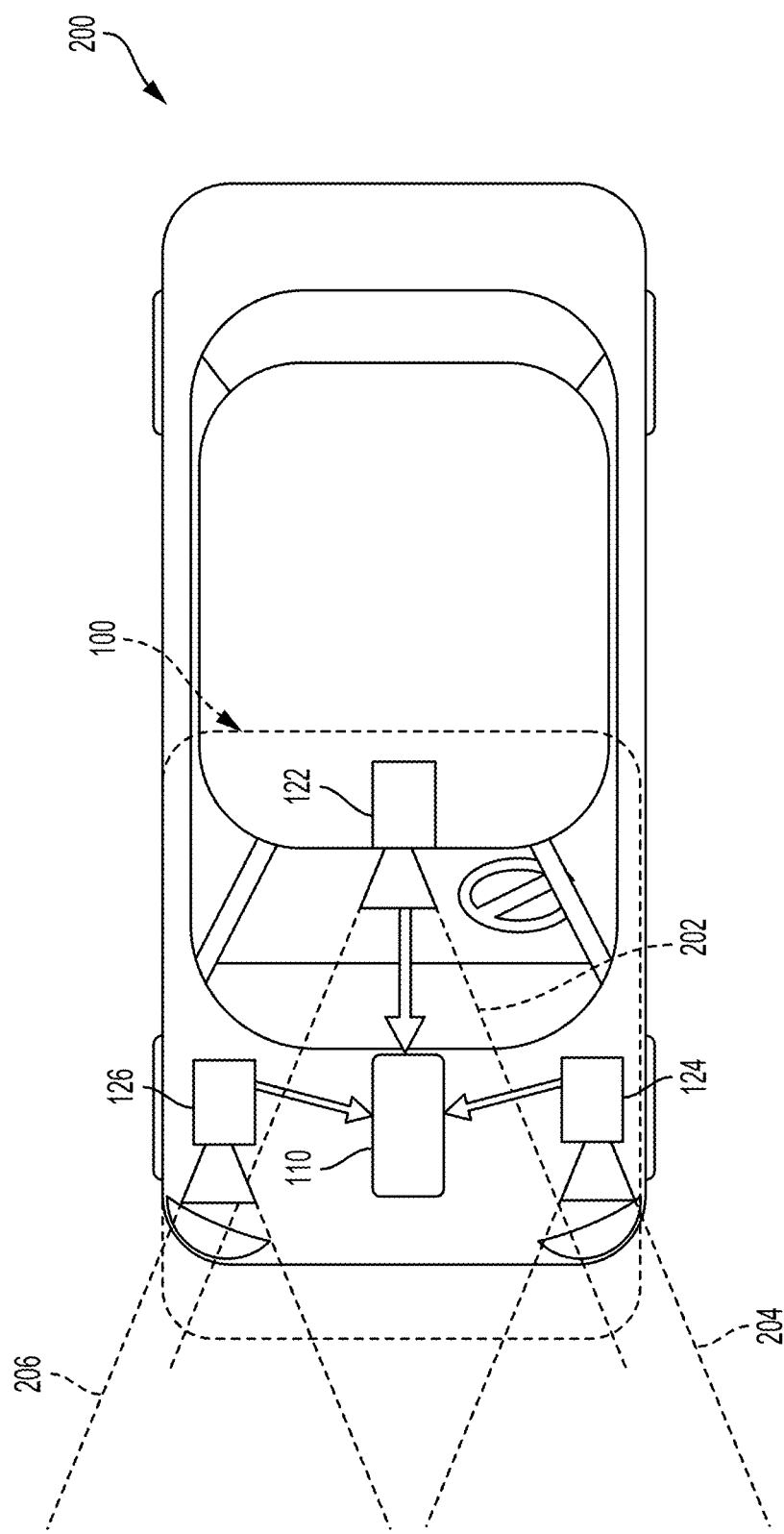
FIG. 2D is a diagrammatic top view representation of yet another embodiment of a vehicle including a system consistent with the disclosed embodiments.
Figure 2E:
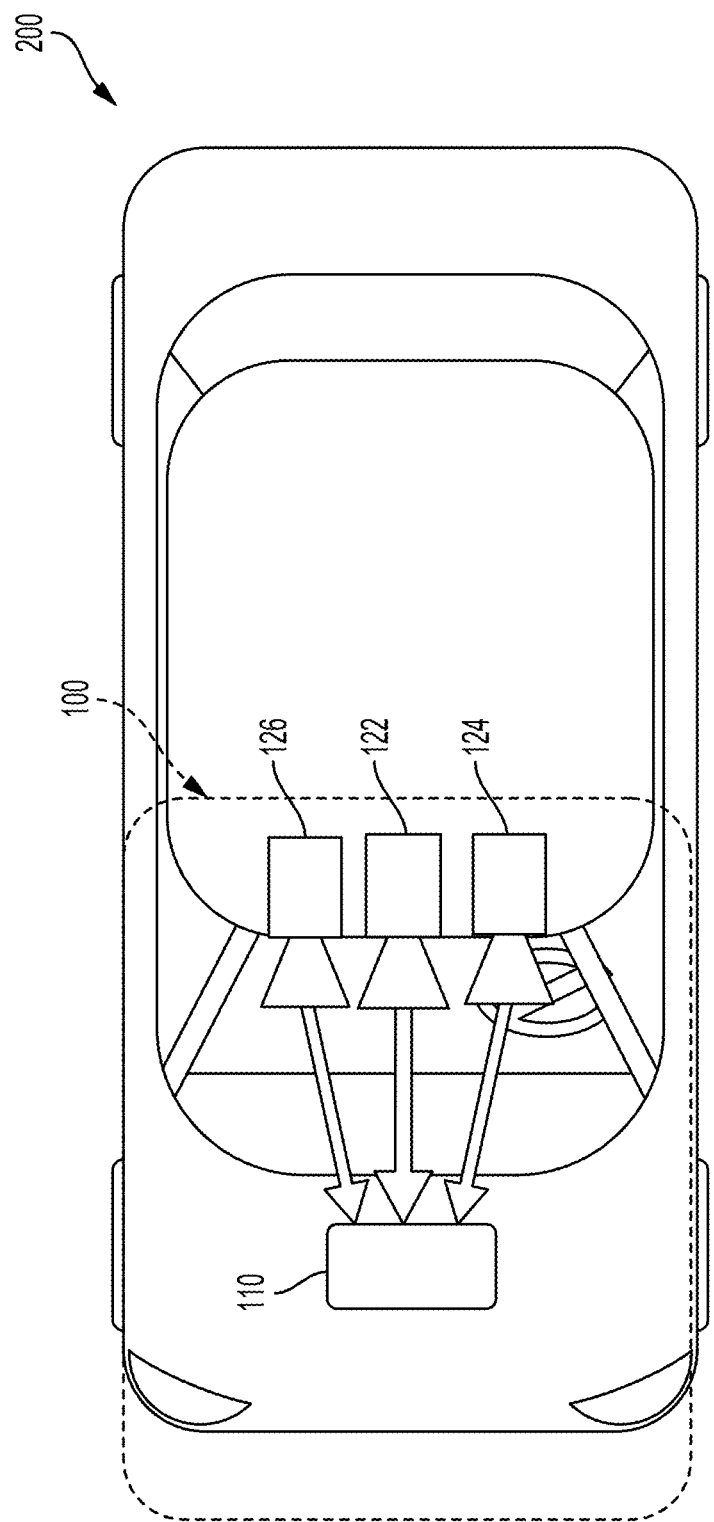
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired field-of-view (FOV) 202, as illustrated in FIG. 2D.

The first image capture device 122 may have a scan rate associated with acquisition of each of the first series of image scan lines. The scan rate may refer to a rate at which an image sensor can acquire image data associated with each pixel included in a particular scan line.

Figure 2F:
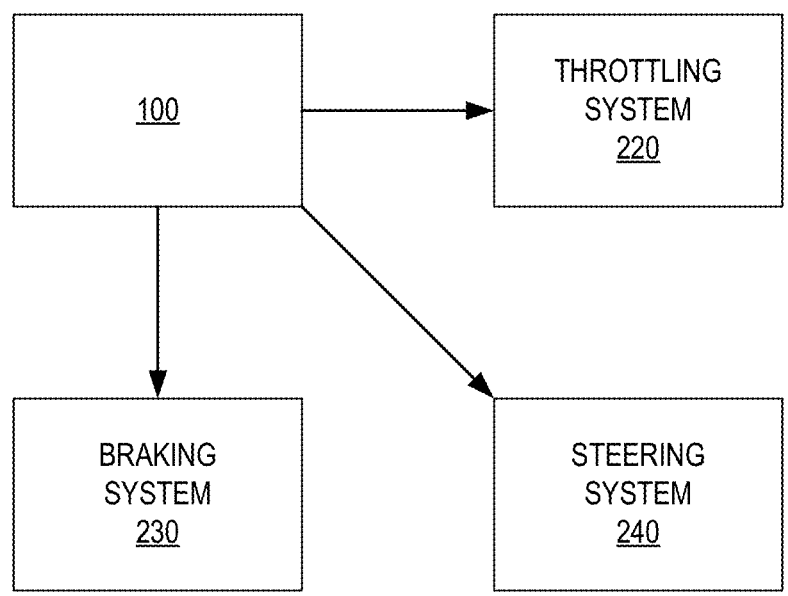
FIG. 2F is a diagrammatic representation of exemplary vehicle control systems consistent with the disclosed embodiments.

FIG. 2F is a diagrammatic representation of vehicle control systems, according to examples of the presently disclosed subject matter. As indicated in FIG. 2F, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3A:
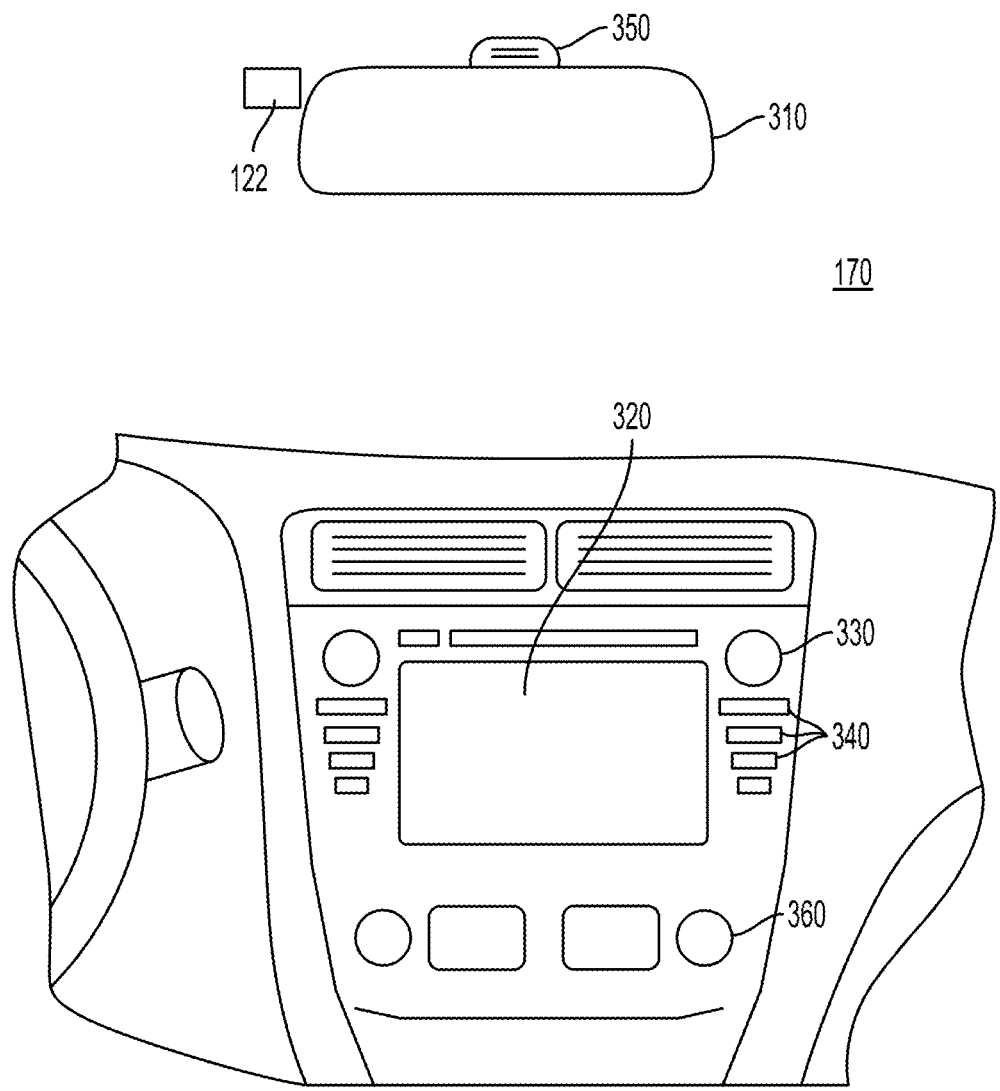
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
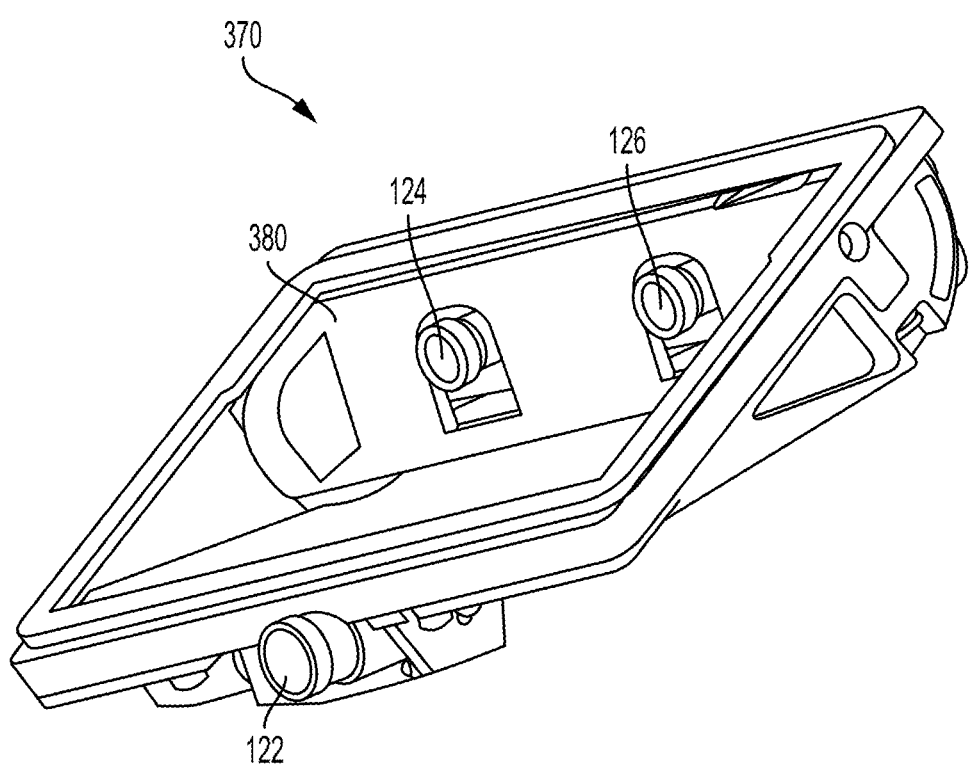
FIG. 3B is an illustration of an example of a camera mount that is configured to be positioned behind a rearview mirror and against a vehicle windshield consistent with the disclosed embodiments.
Figure 3C:
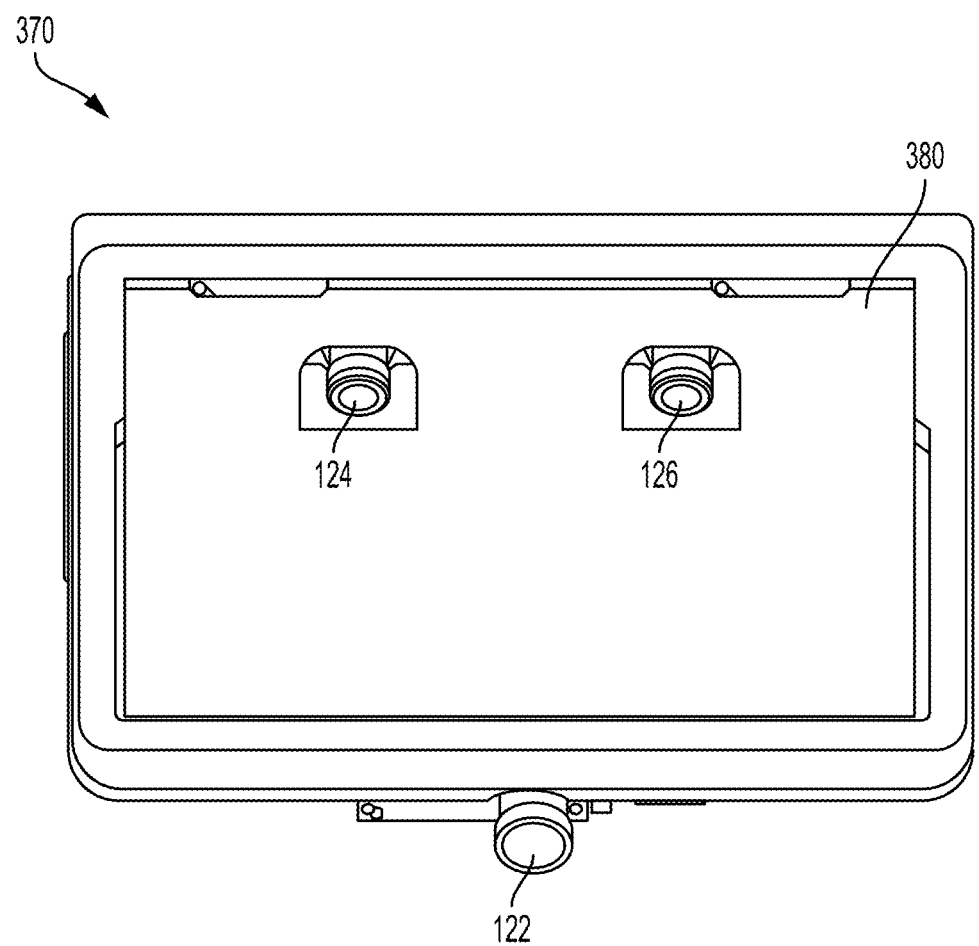
FIG. 3C is an illustration of the camera mount shown in FIG. 3B from a different perspective consistent with the disclosed embodiments.
Figure 3D:
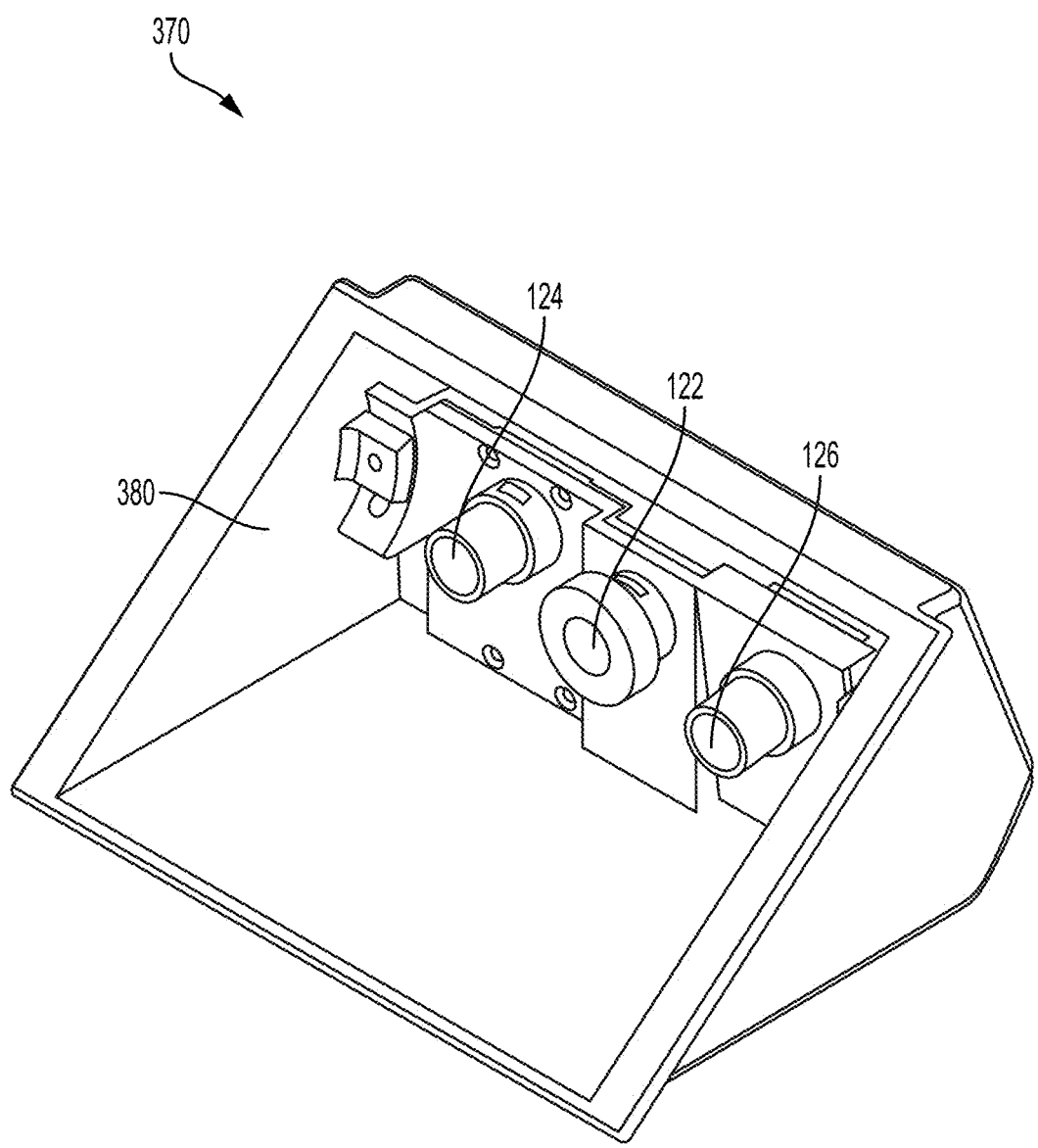
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Multi-Imaging System

As discussed above, system 100 may provide drive assist functionality or semi or fully autonomous driving functionality that uses a single or a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform processing of the narrow FOV camera or even a cropped FOV of the camera. In some embodiments, the first processing device can be configured to use a trained system to estimate a future path ahead of a current location of a vehicle, in accordance with examples of the presently disclosed subject matter. In some embodiments, the trained system may include a network, such as a neural network. In some other embodiments, the trained system may include a deep leaning system using, for example, machine leaning algorithms.

The first processing device can be further adapted to preform image processing tasks, for example, which can be intended to detect other vehicles, pedestrians, lane marks, traffic signs, traffic lights, and other road objects. Still further, the first processing device may calculate a disparity of pixels between the images from the main camera and the narrow camera and create a 3D reconstruction of the environment of vehicle 200. The first processing device may then combine the 3D reconstruction with 3D map data (e.g., a depth map) or with 3D information calculated based on information from another camera. In some embodiments, the first processing device can be configured to use the trained system on depth information (for example the 3D map data) to estimate a future path ahead of a current location of a vehicle, in accordance with examples of the presently disclosed subject matter. In this implementation, the system (e.g., a neural network, deep learning system, etc.) can be trained on depth information, such as 3D map data.

The second processing device may receive images from main camera and can be configured to perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images or with the depth information obtained by stereo processing.

The third processing device may receive images from the wide FOV camera and process the images to detect vehicles, pedestrians, lane marks, traffic signs, traffic lights, and other road objects. The third processing device may execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device)

may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

As will be appreciated by a person skilled in the art having the benefit of this disclosure, numerous variations and/or modifications can be made to the foregoing disclosed examples. For example, not all components are essential for the operation of system 100. Further, any component can be located in any appropriate part of system 100 and the components can be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 or alert a user of the vehicle in response to the analysis.

As discussed below in further detail and according to examples of the presently disclosed subject matter, system 100 may provide a variety of features related to autonomous driving, semi-autonomous driving, and/or driver assist technology. For example, system 100 can analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 can analyze the collected data to determine whether or not vehicle 200 should take a certain action, and then automatically take the determined action without human intervention or it can provide a warning, alert or instruction which can indicate to a driver that a certain action needs to be taken. Automatic actions can be carried out under human supervision and can be subject to human intervention and/or override. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 can analyze the collected data and issue warnings and/or alerts to vehicle occupants based on the analysis of the collected data.

Figure 4:
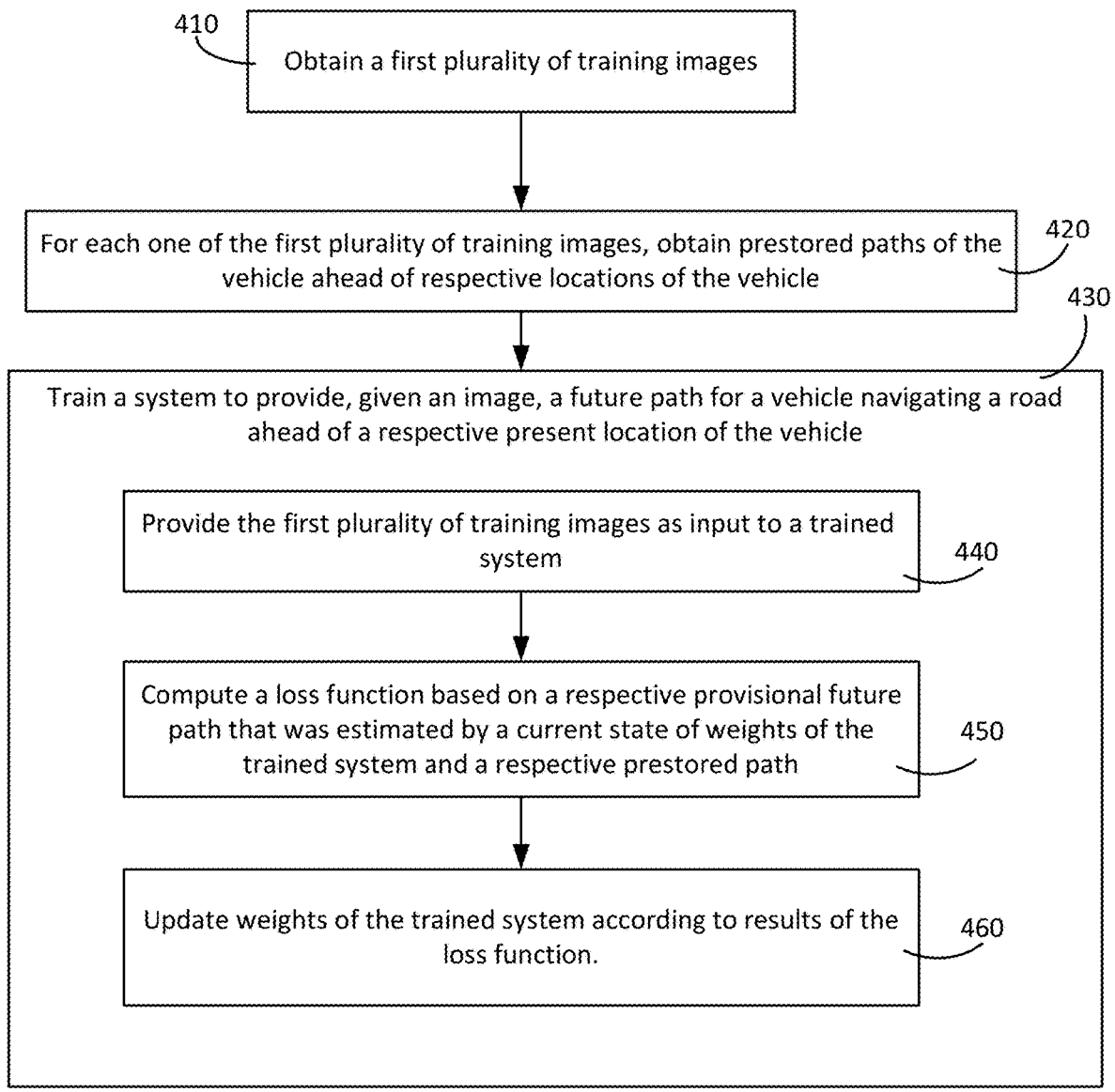
FIG. 4 is a flow chart illustration of a method of processing images to provide a trained system consistent with the disclosed embodiments.

Reference is now made to FIG. 4, which is a flow chart illustration of a method of processing images to provide a trained system which is capable of estimating a future path ahead of a current location of a vehicle based on an image captured at the current location, in accordance with examples of the presently disclosed subject matter. The method of processing images can include: obtaining a first plurality of training images, each one of the first plurality of training images is an image of an environment ahead of a vehicle navigating a road (block 410). In some embodiments, the first plurality of images are not limited to being images of an environment ahead of a vehicle navigating a road, and can include images of other sides of the vehicle navigating the road, for example of the environment at a side(s) of the vehicle and/or of the environment at a rearward direction.

Figure 5:
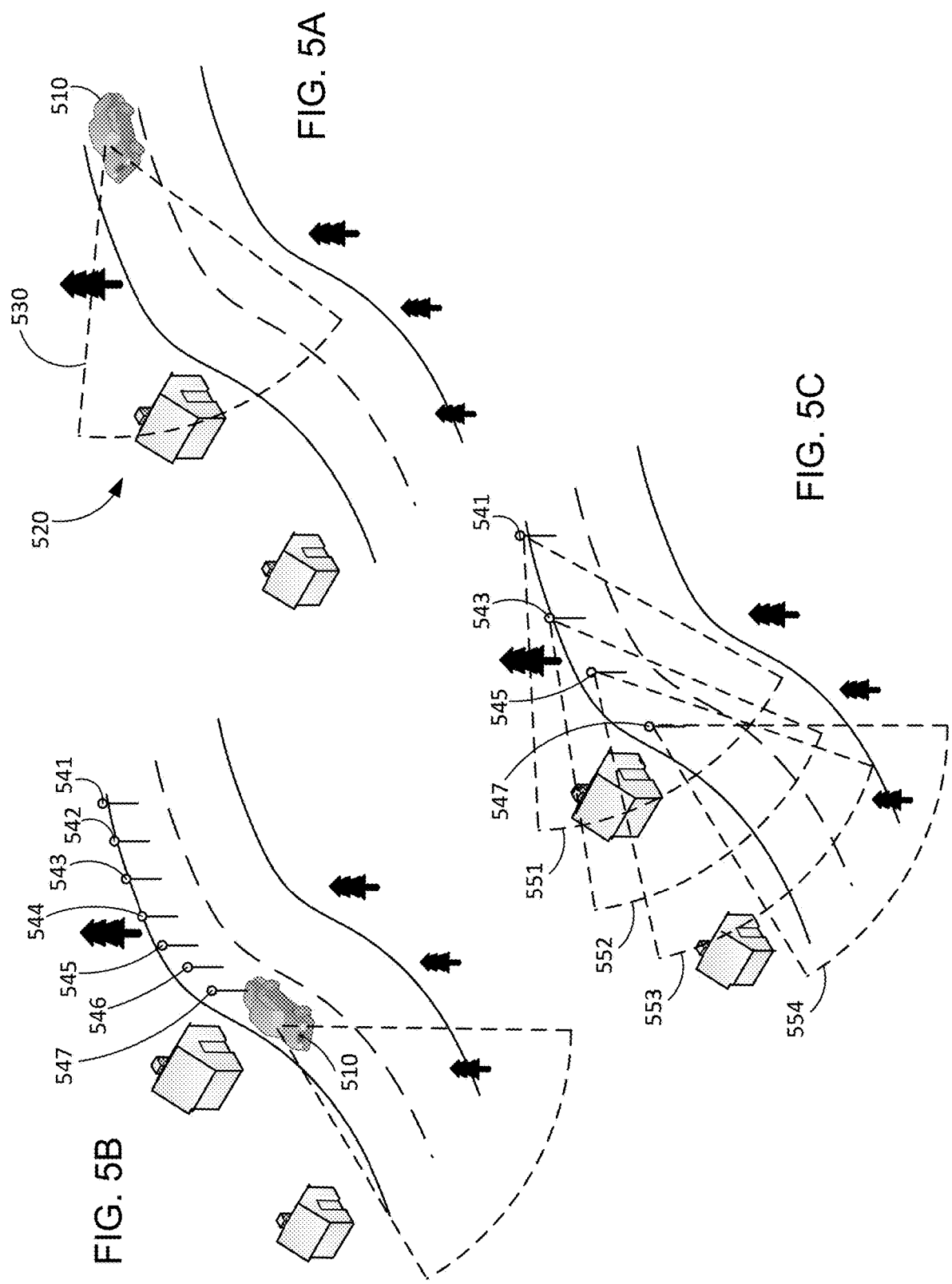
FIGS. 5A-5C are graphical illustrations of features of the method of processing images to provide a trained system consistent with the disclosed embodiments.

For each one of the first plurality of training images, a prestored path of the vehicle ahead of a respective present location of the vehicle can be obtained (block 420). Reference is now additionally made to FIG. 5A-5C, which are graphical illustrations of features of the method of processing images to provide a trained system which is capable of estimating a future path ahead of a current location of a vehicle based on an image captured at the current location, in accordance with examples of the presently disclosed subject matter. As can be seen in FIG. 5A, a vehicle 510 is entering a section of road 520. The vehicle 510 includes a camera (not shown) which captures images. In FIG. 5A, an image is illustrated by cone 530 which represents the FOV of the camera mounted in vehicle 510. The image depicts arbitrary objects in the FOV of the camera. The image typically includes road objects, such as road signs, lane marks, curbs, other vehicles, etc. In addition, at least some of the images that are used in the method of processing images to provide a trained system which is capable of estimating a future path ahead of a current location of a vehicle based on an image captured at the current location, include other arbitrary objects, such as structures and trees at the sides of the road, etc.

In the examples, shown in FIGS. 5A-5C, the images captured by the camera onboard the vehicle 510 are images of an environment ahead of the vehicle 510 navigating the road 520.

As can be seen in FIGS. 5B and 5C, the vehicle 510 travels along (a segment of) road 520, and its path is recorded. The path of vehicle 510 is marked with pins 541-547. The path of the vehicle 510 along the road 520, from location 541 to location 547, is recorded. Thus, the future path of the vehicle from point 541, down road 520, is available. It would be appreciated that the specific location of vehicle 510 and the 2D or 3D shape of the road is arbitrary, and that examples of the presently disclosed subject matter are applicable to various locations on any road. As is shown in FIG. 5C, as the vehicle 510 travels along the road 520, the camera captures a plurality of images, represented by cones 551-554. One or more images can be captured for each of the locations 541-547 or only for some of the recorded locations, however for convenience, in FIG. 5C images are illustrated only for a subset of the recorded locations of vehicle 510 along the road 520.

Resuming the description of FIG. 4, a system (e.g., a neural network, deep learning system, etc.) can be trained to provide, given an image, a future path for a vehicle navigating a road ahead of a respective present location of the vehicle (block 430). Training the system (block 430) can include: providing the first plurality of training images as input to a trained system (block 440); at each iteration of the training, computing a loss function based on a respective provisional future path that was estimated by a current state of weights of the trained system and a respective prestored path (block 450); and updating the weights of the trained system according to results of the loss function (block 460).

Typically, a very large number of images are provide to the trained system during the training phase, and for each image a prestored path of the vehicle ahead of a respective present location of the vehicle is provided. The prestored path can be obtained by recording the future locations of the vehicle along the road on which the vehicle was traveling while the image was captured. In another example, the prestored path can be generated manually or using image processing by identifying, visually or algorithmically, various objects in the road or in a vicinity of the road, which indicate a location of the vehicle on the road. The location of the vehicle on the road can be the actual location of the vehicle on the road during the session when the image was captured, or it can be an estimated or artificially generated location. For example, in one example, images can be taken every few meters or even tens of meters, the future path of the vehicle can be outlined by technicians based on lane markings or based on any other objects which the technician visually identifies in each image. In the lane markings example, the technicians may outline the future path for an image where the lane markings appear, at a certain (say predefined) offset from the lane markings, say in the middle of the lane that is distinguished by lane markings on either side thereof.

Figure 9:
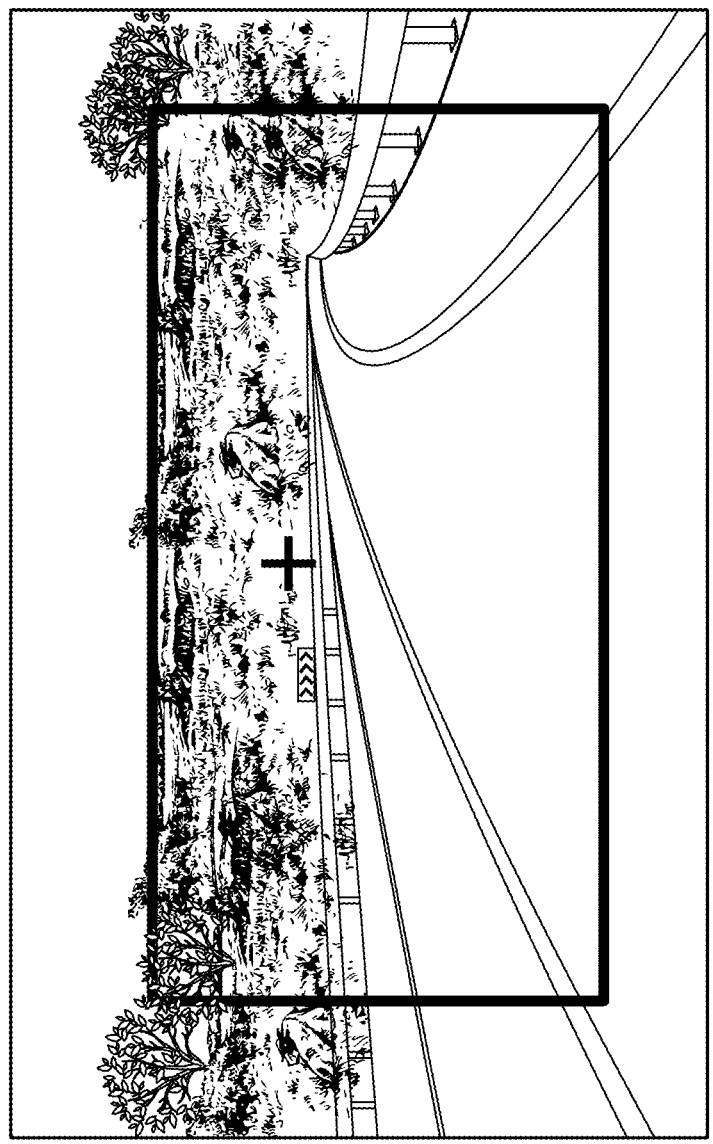
FIG. 9 illustrates an image that is provided to a system during a training phase consistent with some disclosed embodiments.
Figure 10:
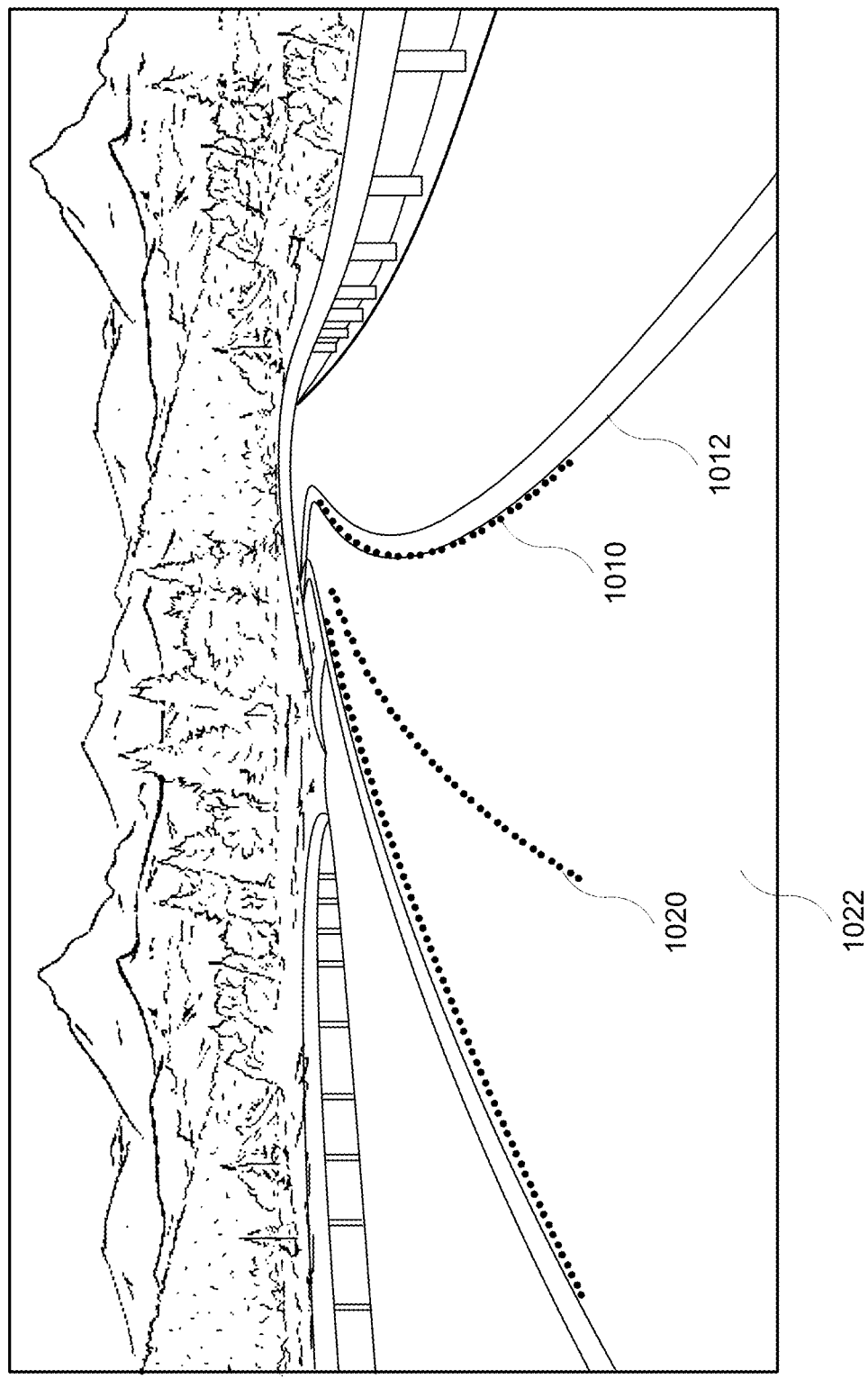
FIG. 10 illustrates an image that is provided to a system during a training phase consistent with some disclosed embodiments.
Figure 12A:
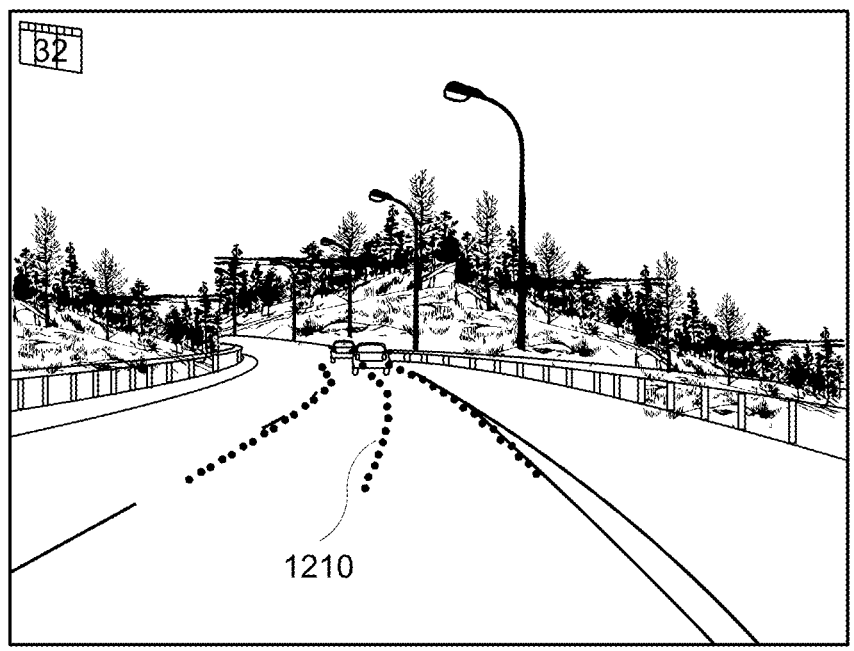
FIGS. 12A-12D illustrate images including estimated future paths consistent with the disclosed embodiments.
Figure 12B:
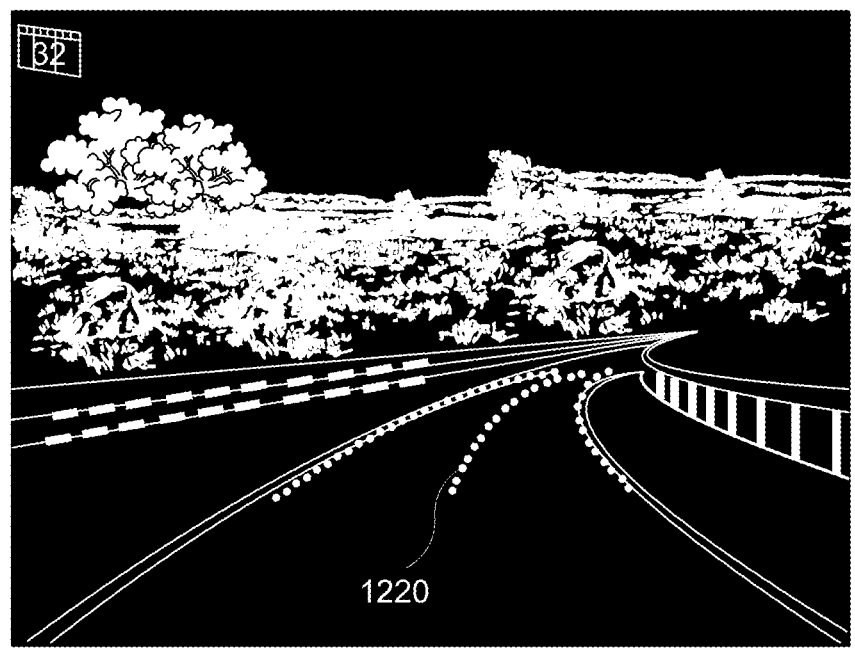
Figure 12C:
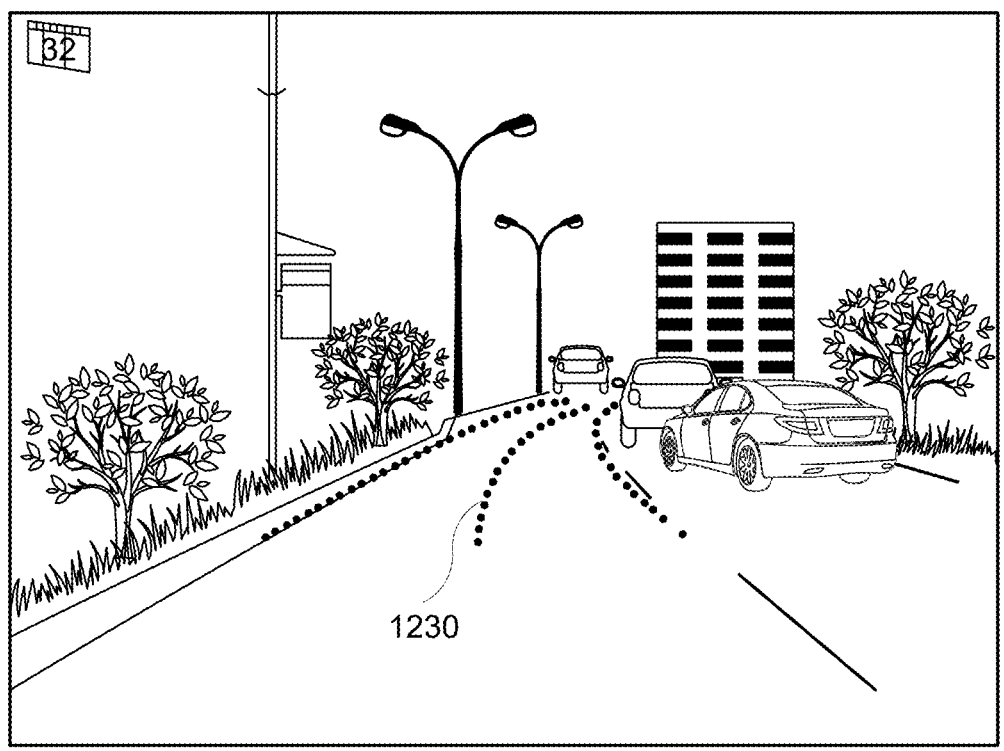
Figure 12D:
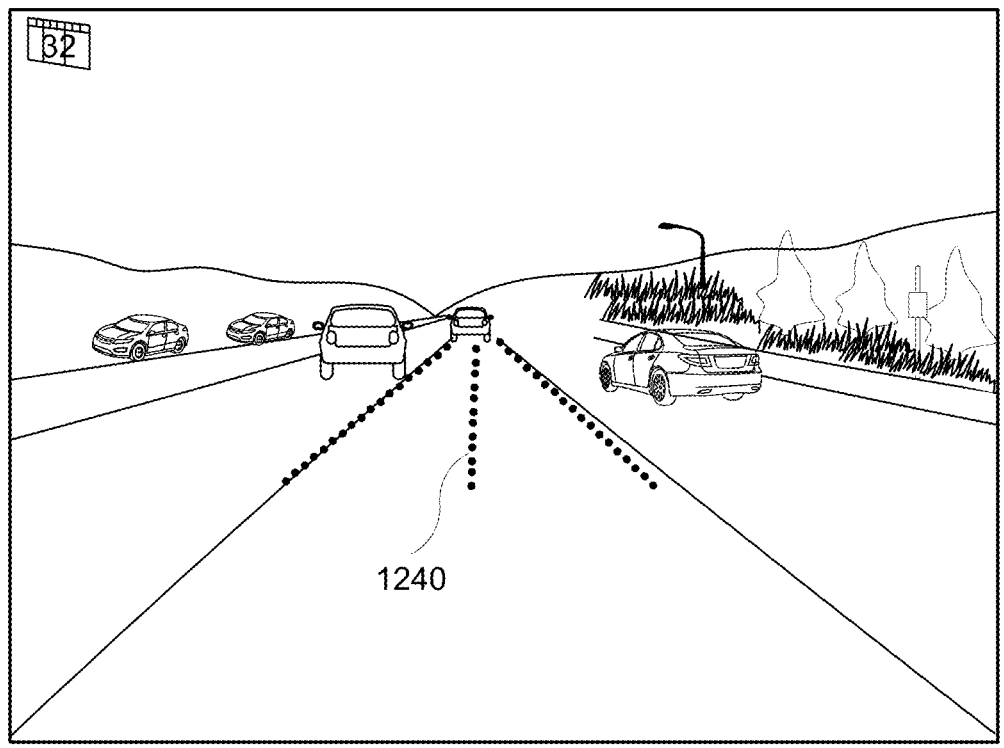

FIGS. 9 and 10 illustrate images that may be provided to a machine learning process, e.g., using a trained system (e.g., a neural network, deep learning system, etc.), during a training phase consistent with some disclosed embodiments. FIG. 10 additionally illustrates points 1010 on lane markings 1012 and points 1020 on the center of the lane, detected by image processing or by technicians.

Figure 8A:
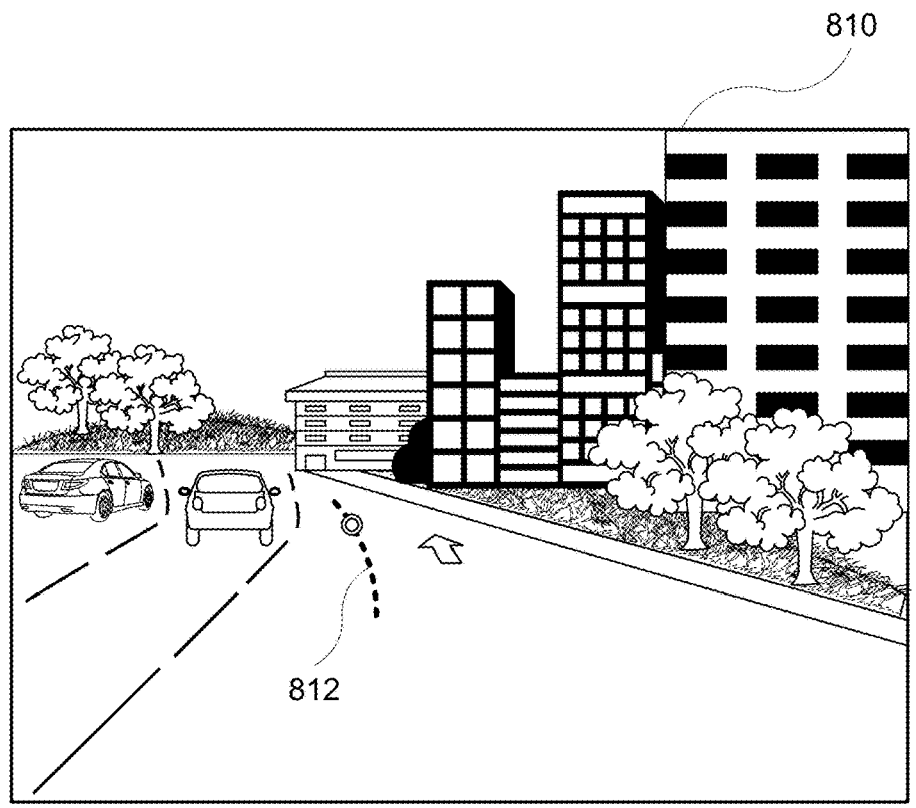
FIG. 8A illustrates an image of an environment ahead of a vehicle navigating a road consistent with some disclosed embodiments.
Figure 8B:
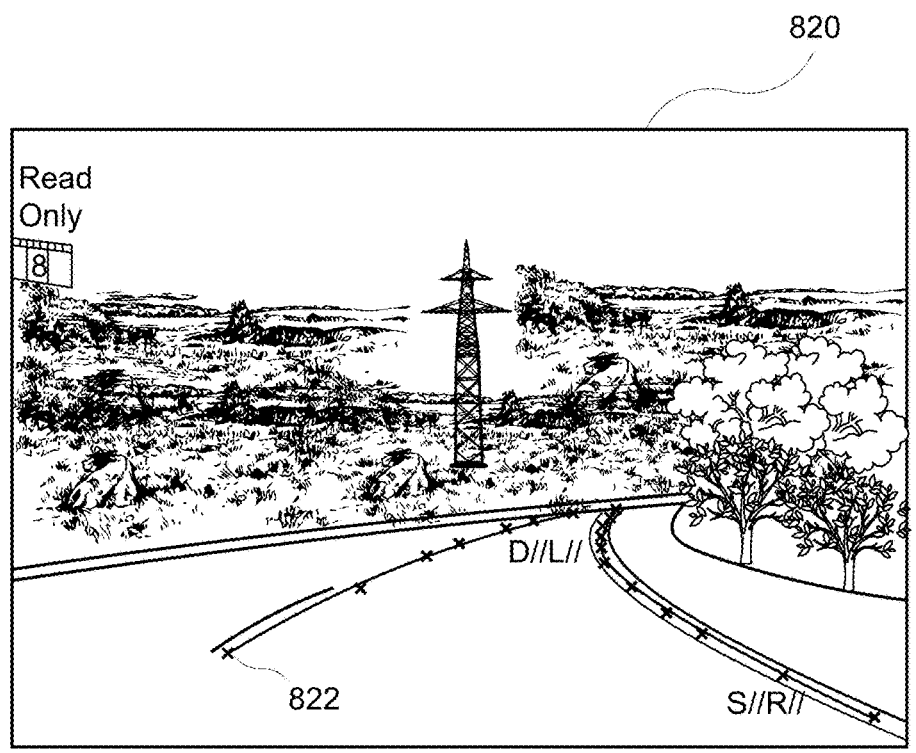
FIG. 8B illustrates an image of an environment ahead of a vehicle navigating a road consistent with some disclosed embodiments.

Reference is now additionally made to FIG. 8A which shows an image 810 of an environment ahead of a vehicle navigating a road and a prestored path 812 that was recorded for this image using the vehicle's ego-motion, according to examples of the presently disclosed subject matter; and to FIG. 8B which shows an image 820 of an environment ahead of a vehicle navigating a road, the image includes marked lane markings 822 that were marked by a technician or by a computer-vision algorithm, according to examples of the presently disclosed subject matter. The prestored path that is based on the marked lane markings can be generated and prestored for the image shown in FIG. 8B. The ego-motion track of the vehicle for a given image, which can be used to define the path of the vehicle ahead of the current location of the vehicle (the location for where the image was captured) can be determined by processing subsequent image, for example, the subsequent images are images that were captured as the car continued to move ahead the road (e.g., forward of the current location).

Figure 13:
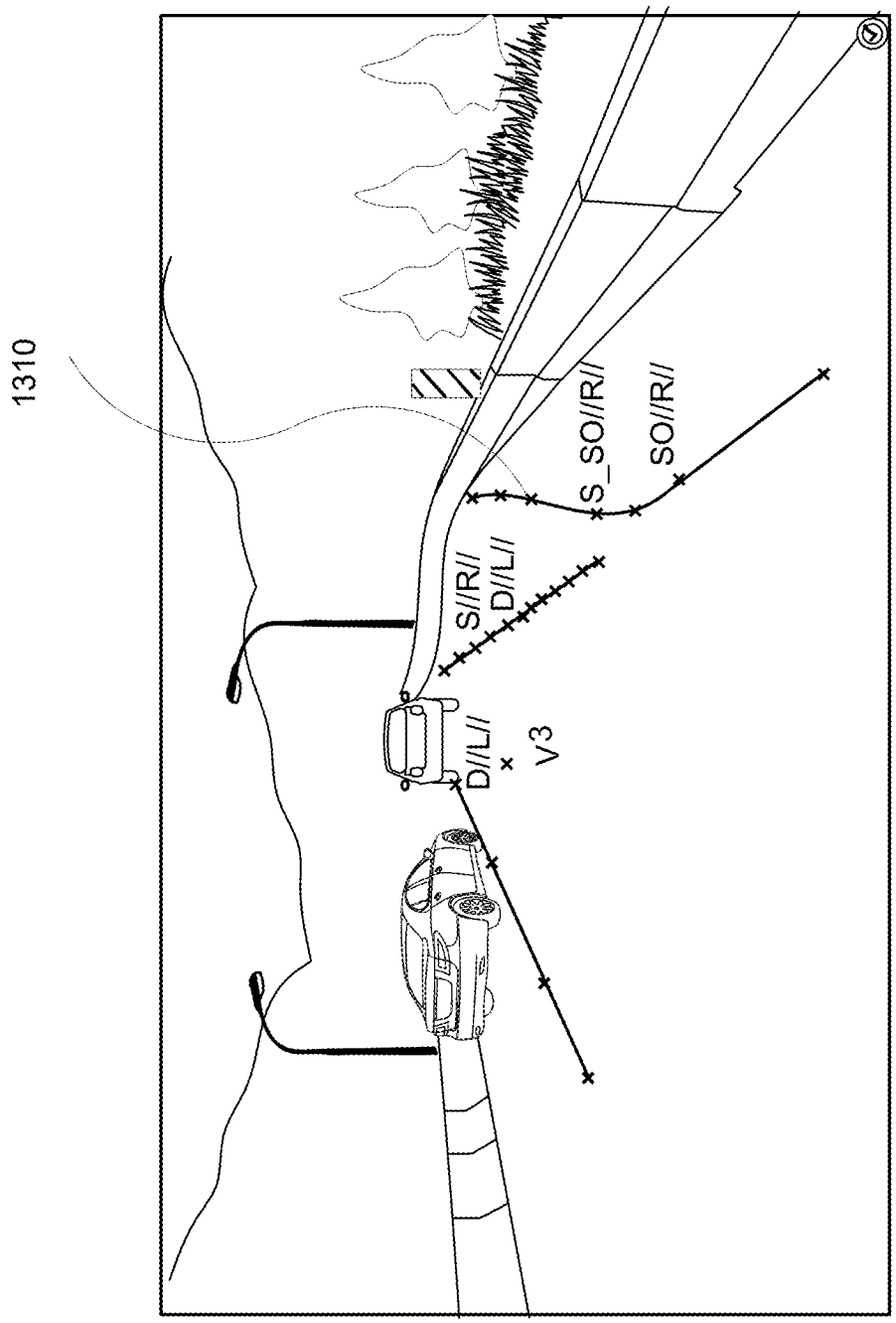
FIG. 13 illustrates an input image with virtual lane marks added to mark a highway exist, consistent with the disclosed embodiments.

As mentioned above, at each iteration of the training, a loss function is computed based on a respective provisional future path that was estimated by a current state of weights and a respective prestored path (block 450). The weights of the trained system can be updated according to results of the loss function (block 460). Reference is now made to FIGS. 11A and 11B, which provide graphical illustrations of certain aspects of the raining, according to examples of the presently disclosed subject matter. In FIG. 11A an iteration of the training is shown. In FIG. 11A, a prestored path 1112 was generated based on detection (e.g., by technicians) of lane marks on the road ahead of the location from where an image 1110 was captured. A provisional future path 1114 is computed by the trained system, and a loss function is computed based on a respective provisional future path 1114 that was estimated by a current state of weights and a respective prestored path 1112. According to examples of the presently disclosed subject matter, the loss function uses a top view ("in the world") representation, e.g., using the camera(s) focal length, the camera(s) height and a dynamic horizon, of the prestored path 1112 and of the provisional future path 1114, and absolute loss is computed. The loss function can be configured to penalized errors in meters in the real world (it focalized the scoring on far errors). In some embodiments, the marked object, for example, the lane marking manually marked by technicians, can also include virtual objects, such as junctions, areas where lane marks are missing, unmarked highway exits or merges, etc., as is shown for example, in FIG. 13, where virtual lane marks 1310 are added to mark a highway exist, in accordance with examples of the presently disclosed subject matter.

In FIG. 11B, a prestored path 1122 was generated based on ego-motion of the vehicle, and its subsequent path along the road (which in this case is) ahead of the location from where an 1120 image was captured. According to examples of the presently disclosed subject matter, for ego-motion based prestored path data, an optimal offset between the prestored path 1122 and a provisional future path 1124 provided by the trained system can be determined, and the loss function can be computed after correction by the optimal offset.

According to examples of the presently disclosed subject matter, the training of the system can be carried out until a stop condition is met. In some embodiments, the stop condition can be a certain number of iterations. For example, the first plurality of training images can include a relatively higher number of images of environments which appear relatively rarely on roads, for example, images of environments that comprise a curved road. In another example, the first plurality of training images includes a relatively higher number of images of environments that comprise a lane split, a lane merge, a highway exit, a highway entrance and/or a junction; in yet another example. In yet another example, the first plurality of training images can includes a relatively higher number of images of environments that comprise a poor or no lane markings, Botts dots and/or shadows on a road ahead of the vehicle.

Figure 7:
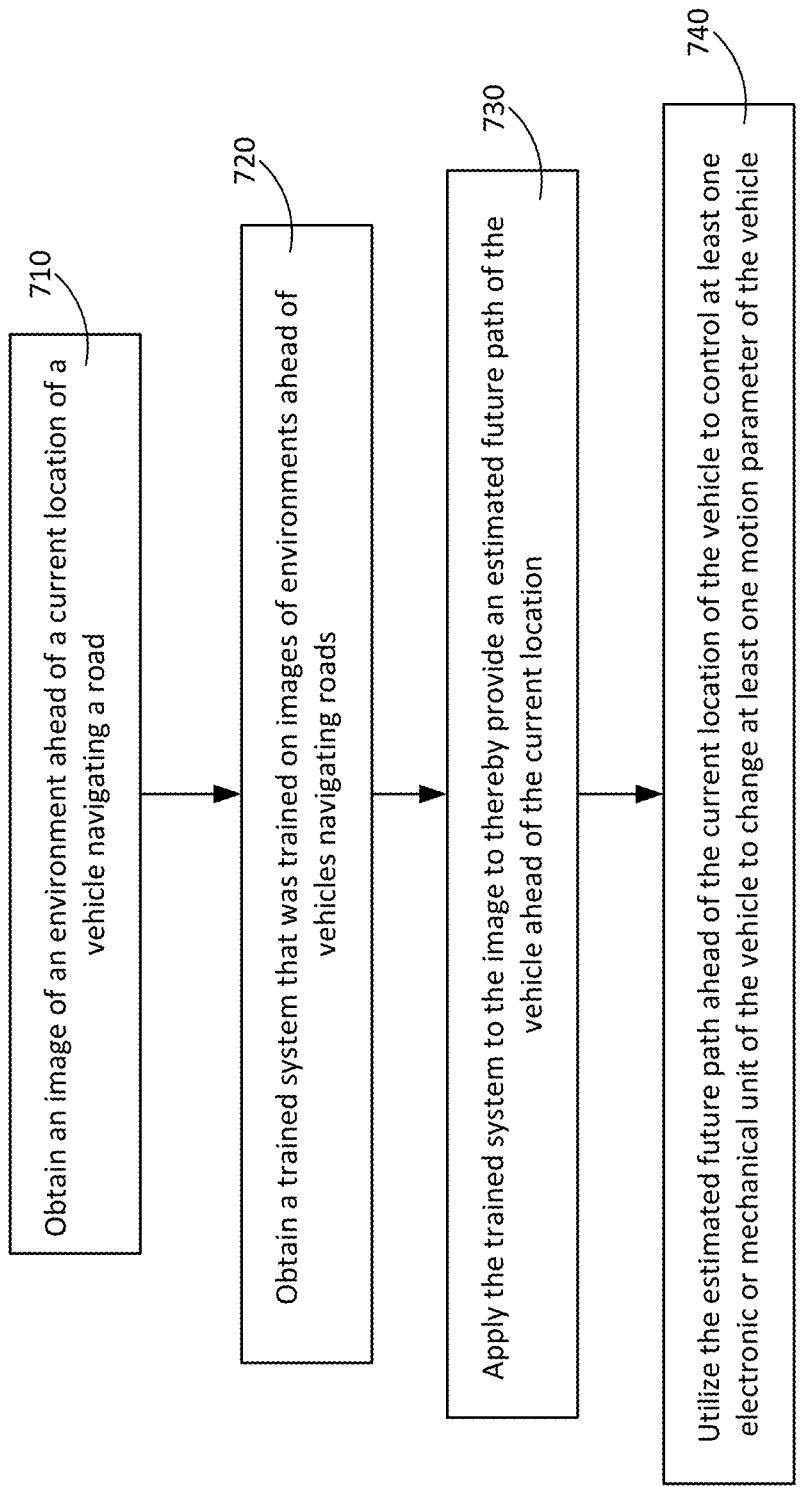
FIG. 7 is a flow chart illustration of a method of estimating a future path ahead of a current location of a vehicle, according to examples of the presently disclosed subject matter.

According to a further aspect of the presently disclosed subject matter, there is provided a system and a method for estimating a future path ahead of a current location of a vehicle. Reference is now made to FIG. 7, which is a flow chart illustration of a method of estimating a future path ahead of a current location of a vehicle, according to examples of the presently disclosed subject matter. The method may be implemented by a processor. According to examples of the presently disclosed subject matter, the method of estimating a future path ahead of a current location of a vehicle can include: obtaining an image of an environment ahead of a current arbitrary location of a vehicle navigating a road (block 710). A system that was trained to estimate a future path on a first plurality of images of environments ahead of vehicles navigating roads can be obtained (block 720). In some embodiments, the trained system may include a network, such as a neural network. In other embodiments, the trained system can be a deep leaning system using, for example, machine leaning algorithms. The trained system can be applied to the image of the environment ahead of the current arbitrary location of the vehicle (block 730). An estimated future path of the vehicle ahead of the current arbitrary location can be provided by the trained system (block 740).

Figure 6:
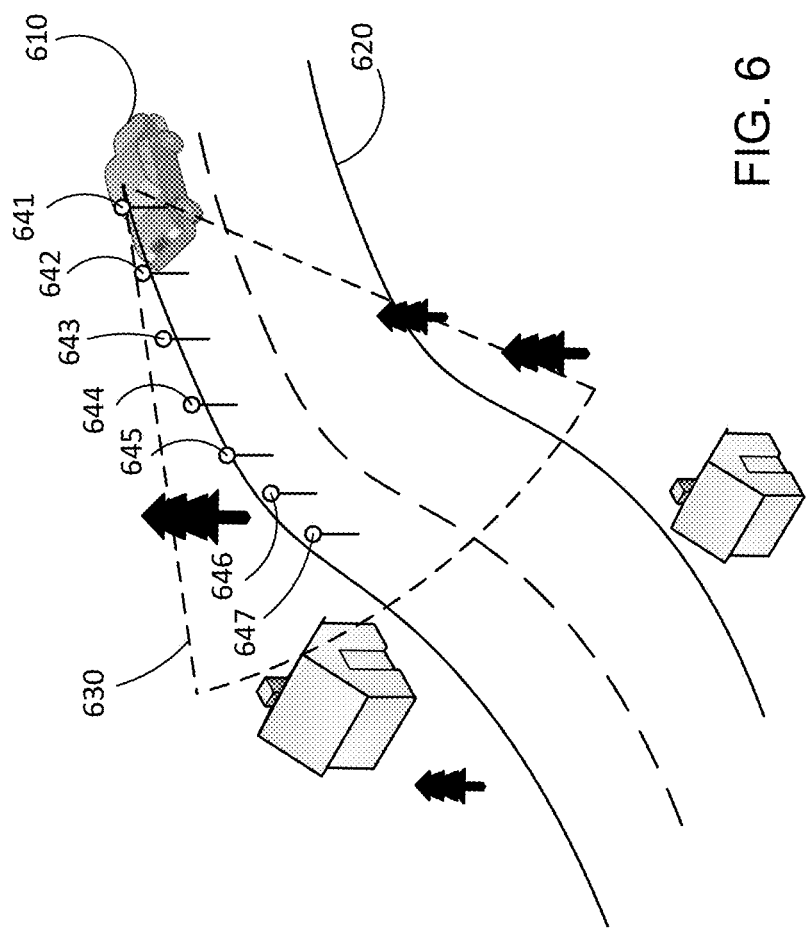
FIG. 6 is a graphical illustration of certain aspects of a method of estimating a future path ahead of a current location of a vehicle consistent with the disclosed embodiments.

Reference is made to FIG. 6, which is a graphical illustration of certain aspects of the method of estimating a future path ahead of a current location of a vehicle, according to examples of the presently disclosed subject matter. As is shown in FIG. 6, a vehicle 610 is entering a section of road 620. The road 620 is an arbitrary road, and images from the road 620 may or may not have been used in the training of the system (e.g., a neural network, deep learning system, etc.). The vehicle 610 includes a camera (not shown) which captures images. The images captured by the camera on board the vehicle 620 may or may not be cropped, or processed in any other way (e.g., down sampled) before being fed to the trained system. In FIG. 6, an image is illustrated by cone 630 which represents the FOV of the camera mounted in vehicle 610. The image depicts arbitrary objects in the FOV of the camera. The image can, but does not necessarily, include road objects, such as road signs, lane marks, curbs, other vehicles, etc. The image can include other arbitrary objects, such as structures and trees at the sides of the road, etc.

The trained system can be applied to the image 630 of the environment ahead of the current arbitrary location of the vehicle 610, and can provide an estimated future path of the vehicle 610 ahead of the current arbitrary location. In FIG. 6, the estimated future path is denoted by pins 641-647. FIGS. 12A-12D further illustrate images including the estimated future paths 1210-1240 consistent with the disclosed embodiments.

In some embodiments, the trained system can include piece-wise affine functions of global functions. In some embodiments, the global functions can include: convolutions, max pooling and/or rectifier liner unit (ReLU).

In some embodiments, the method can further include: utilizing the estimated future path ahead of the current location of the vehicle to control at least one electronic or mechanical unit of the vehicle to change at least one motion parameter of the vehicle. In some embodiments, the method can further include: utilizing the estimated future path ahead of the current location of the vehicle to provide a sensory feedback to a driver of the vehicle.

In some embodiments, the estimated future path of the vehicle ahead of the current location can be further based on identifying one or more predefined objects appearing in the image of the environment using at least one classifier.

The method can further include: utilizing the estimated future path ahead of the current location of the vehicle to provide a control point for a steering control function of the vehicle.

In some embodiments, applying the trained system to the image of the environment ahead of the current location of the vehicle provides two or more estimated future paths of the vehicle ahead of the current location.

In some embodiments, the method can further include: utilizing the estimated future path ahead of the current location of the vehicle in estimating a road profile ahead of the current location of the vehicle.

In some embodiments, applying the trained system to the image of the environment ahead of the current location of the vehicle provides two or more estimated future paths of the vehicle ahead of the current location, and can further include estimating a road profile along each one of the two or more estimated future paths of the vehicle ahead of the current location.

In some embodiments, the method can further include: utilizing the estimated future path ahead of the current location of the vehicle in detecting one or more vehicles that are located in or near the future path of the vehicle.

In some embodiments, the method can further include causing at least one electronic or mechanical unit of the vehicle to change at least one motion parameter of the vehicle based on a location of one or more vehicles which were determined to be in or near the future path of the vehicle.

In some embodiments, the method can further include: triggering a sensory alert to indicate to a user of that one or more vehicles are determined to be in or near the future path of the vehicle.

In some embodiments, in addition to processing images of an environment ahead of a vehicle navigating a road for training a system (e.g., a neural network, deep learning system, etc.) to estimate a future path of a vehicle based on images and/or processing images of an environment ahead of a vehicle navigating a road using a trained system to estimate a future path of the vehicle, a confidence level may be provided in the training phase or used in the navigation phase which uses the trained system. A Holistic Path Prediction (HPP) confidence is an output made by a trained system, such as a neural network, similar to a neural network for HPP. The concept may generate a classifier that tries to guess the error of another classifier on the same image. One method of implementing this is using one trained system (e.g., a first neural network) to give the used output (for example, a location of lane, or center of lane, or predicted future path), and to train another system (e.g., a second neural network), using the same input data (or a subset of that data, or features that are extracted from that data) to estimate the error of the first trained system on that image (e.g., estimate absolute-average-loss of the prediction of the first trained system).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. At least one non-transitory machine-readable storage medium comprising instructions, which when executed by processor circuitry of a computing device, cause the processor circuitry to perform operations to:
  obtain an image that represents a scene of an environment captured from a current location of a vehicle;
  apply a neural network model to the image, the neural network model trained to identify multiple future trajectories from an input image,
    wherein the neural network model produces two or more predicted future trajectories of the vehicle ahead of the current location of the vehicle when applied to the image; and
  utilize the two or more predicted future trajectories of the vehicle to change operation of the vehicle on a roadway within the environment.

2. The machine-readable storage medium of claim 1, wherein the instructions further cause the processor circuitry to: provide a command to the vehicle to change at least one motion parameter of the operation of the vehicle.

3. The machine-readable storage medium of claim 2, wherein the at least one motion parameter relates to steering or speed of the vehicle.

4. The machine-readable storage medium of claim 1, wherein the neural network model is trained to produce the two or more predicted future trajectories of the vehicle from one or more features extracted from the image.

5. The machine-readable storage medium of claim 1, wherein the neural network model is trained to produce the two or more predicted future trajectories of the vehicle from an offset from a particular point of the roadway.

6. The machine-readable storage medium of claim 1, wherein the instructions further cause the processor circuitry to:
  obtain map data indicating features of the roadway;
  wherein the neural network model further produces the two or more predicted future trajectories of the vehicle based on the features of the roadway.

7. The machine-readable storage medium of claim 6, wherein the map data is obtained from a remote system.

8. The machine-readable storage medium of claim 1, wherein the instructions further cause the processor circuitry to:
  obtain data indicating past states of the vehicle;
  wherein the neural network model further produces the two or more predicted future trajectories of the vehicle based on the past states of the vehicle.

9. The machine-readable storage medium of claim 1, wherein training of the neural network model occurs with multiple training images.

10. The machine-readable storage medium of claim 1, wherein the image is captured by a camera of the vehicle.

11. A computing device, comprising:
  memory to store an image that represents a scene of an environment captured from a current location of a vehicle; and
  processor circuitry configured to:
  apply a neural network model to the image, the neural network model trained to identify multiple future trajectories from an input image,
    wherein the neural network model produces two or more predicted future trajectories of the vehicle ahead of the current location of the vehicle when applied to the image; and
  utilize the two or more predicted future trajectories of the vehicle to change operation of the vehicle on a roadway within the environment.

12. The computing device of claim 11, wherein the processor circuitry is further configured to provide a command to the vehicle to change at least one motion parameter of the operation of the vehicle.

13. The computing device of claim 12, wherein the at least one motion parameter relates to steering or speed of the vehicle.

14. The computing device of claim 11, wherein the neural network model is trained to produce the two or more predicted future trajectories of the vehicle from one or more features extracted from the image.

15. The computing device of claim 11, wherein the neural network model is trained to produce the two or more predicted future trajectories of the vehicle from an offset from a particular point of the roadway.

16. The computing device of claim 11, wherein the processor circuitry is further configured to:
  obtain map data indicating features of the roadway;
  wherein the neural network model further produces the two or more predicted future trajectories of the vehicle based on the features of the roadway.

17. The computing device of claim 16, wherein the map data is obtained from a remote system.

18. The computing device of claim 11, wherein the processor circuitry is further configured to:
  obtain data indicating past states of the vehicle;
  wherein the neural network model further produces the two or more predicted future trajectories of the vehicle based on the past states of the vehicle.

19. The computing device of claim 11, wherein training of the neural network model occurs with multiple training images.

20. The computing device of claim 11, wherein the image is captured by a camera of the vehicle.

21. An apparatus, comprising:
  means for providing an image that represents a scene of an environment captured from a current location of a vehicle;
  means for applying a neural network model to the image, the neural network model trained to identify multiple future trajectories from an input image, wherein the neural network model produces two or more predicted future trajectories of the vehicle ahead of the current location of the vehicle when applied to the image; and
  means for using the two or more predicted future trajectories of the vehicle to change operation of the vehicle on a roadway within the environment.

22. The apparatus of claim 21, further comprising:
  means for communicating a command to the vehicle to change at least one motion parameter of the operation of the vehicle.

23. The apparatus of claim 22, further comprising:
  means for defining at least one motion parameter that relates to steering or speed of the vehicle.

24. The apparatus of claim 21, further comprising:
  means for capturing the image.

* * * * *